(12) United States Patent
Fujita et al.

(10) Patent No.: US 8,900,378 B2
(45) Date of Patent: Dec. 2, 2014

(54) STRUCTURAL MATERIAL

(75) Inventors: Etsunori Fujita, Hiroshima (JP); Yumi Ogura, Hiroshima (JP); Seiji Kawasaki, Hiroshima (JP); Shigeyuki Kojima, Hiroshima (JP); Soichi Makita, Hiroshima (JP); Shigeru Maeda, Aki-gun (JP); Hideyuki Yamane, Aki-gun (JP); Seiya Yoshida, Aki-gun (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 73 days.

(21) Appl. No.: 13/254,642

(22) PCT Filed: Feb. 22, 2010

(86) PCT No.: PCT/JP2010/052653
§ 371 (c)(1),
(2), (4) Date: Oct. 31, 2011

(87) PCT Pub. No.: WO2010/101040
PCT Pub. Date: Sep. 10, 2010

(65) Prior Publication Data
US 2012/0037279 A1 Feb. 16, 2012

(30) Foreign Application Priority Data
Mar. 5, 2009 (JP) ................................. 2009-052741

(51) Int. Cl.
*C22C 38/00* (2006.01)
*C21D 9/00* (2006.01)
*B60N 2/68* (2006.01)
*C21D 1/42* (2006.01)

(52) U.S. Cl.
CPC ................ *B60N 2/68* (2013.01); *C21D 9/0068* (2013.01); *C21D 2221/00* (2013.01); *C21D 1/42* (2013.01)
USPC ........................................................ 148/320

(58) Field of Classification Search
USPC ............................................................ 148/320
See application file for complete search history.

(56) References Cited

U.S. PATENT DOCUMENTS 5,110,176 A * 5/1992 Curtis ...................... 296/187.12
5,641,198 A * 6/1997 Steffens, Jr. ............. 297/216.13
(Continued)

FOREIGN PATENT DOCUMENTS

JP 1 90446 6/1989
JP 9 220673 8/1997
(Continued)

OTHER PUBLICATIONS

Machine translation of JP2007313907, 2007.*
(Continued)

*Primary Examiner* — Rebecca Lee
(74) *Attorney, Agent, or Firm* — Oblon, Spivak, McClelland, Maier & Neustadt, L.L.P.

(57) ABSTRACT

A structural material is provided, the strength and toughness of which are well-balanced at a high level, suitable in particular for seat frames in automobiles, aircrafts and the like. Specifically disclosed is a structural material produced by integrally joining thin steel members in a part thereof and, after joining, thermally heating a part thereof so that the heat-treated part differs from the other parts in strength and toughness. Unlike a structural material, the strength of which as a whole has been uniformly improved by heat treatment, the above-described structural material consists of a part having a high strength and a part having low strength. Thus, a structural material, the strength and toughness of which are well-balanced at a high level can be obtained. Since the strength and toughness are well-balanced at a high level, the structural material is suitable particularly for seat frames in automobiles, aircrafts and the like.

9 Claims, 25 Drawing Sheets

(56) References Cited

U.S. PATENT DOCUMENTS

| | | | |
|---|---|---|---|
| 5,984,419 A * | 11/1999 | Partington et al. | 297/473 |
| 2004/0112484 A1 | 6/2004 | Saito et al. | |
| 2004/0227389 A1* | 11/2004 | Yoshida | 297/452.18 |
| 2005/0167007 A1 | 8/2005 | Miura et al. | |
| 2009/0277547 A1 | 11/2009 | Saito et al. | |

FOREIGN PATENT DOCUMENTS

| JP | 3306874 | 7/2002 |
|---|---|---|
| JP | 2005 213640 | 8/2005 |
| JP | 3993703 | 10/2007 |
| JP | 4005517 | 11/2007 |
| JP | 2007 313907 | 12/2007 |
| JP | 2008 13835 | 1/2008 |
| JP | 2008 297609 | 12/2008 |
| JP | 4189133 | 12/2008 |

OTHER PUBLICATIONS

Machine translation of JP09220673, 1997.*
Machine translation of JP 2008013835, 2008.*
International Search Report Issued May 18, 2010 in PCT/JP10/052653 filed Feb. 22, 2010.

* cited by examiner

DOWNWARD DISPLACEMENT AMOUNT

STRUCTURAL MATERIAL

TECHNICAL FIELD

The present invention relates to a structural material using thin steel and particularly to a structural material using thin steel with high strength and high toughness suitable for a frame member for a seat for transportation equipment such as an automobile, an aircraft and the like.

BACKGROUND ART

For example, a frame member for a seat for transportation equipment such as an automobile, an aircraft and the like is strongly required to be reduced in weight in view of fuel consumption improvement, carbon dioxide emission control or the like, and thus, high strength of a steel material used for forming a frame member for a seat is in demand. On the other hand, the frame member for a seat is also required to have not only high strength but also high toughness (also including ductility) in view of impact absorbing properties owing to deformation or the like. As techniques satisfying these demands, for example, high-strength steel plates disclosed in Patent Literatures 1 to 3 are known.

Each of the high-strength steel plates disclosed in these Literatures assumes control on an addition amount of an alloy element other than carbon, and it is made to contain, for example, Mn, Mo, Cr, or the like in a predetermined amount or more to secure a predetermined hardness or ductility. Then, for use as a steel material for an automobile or the like, the high-strength steel plate is finally cold-rolled down to a thickness of 1.2 mm, but heat treatment performed at a step before the cold rolling is to hot-roll a steel slab to a thickness of 3.2 mm. That is, since the techniques disclosed in these Literatures are techniques for obtaining a steel plate with a thickness of several mm or thicker, it is necessary to achieve evenness of a microstructure including a plate-thickness direction in the steel plate in the heat treatment, and thus, control on an addition amount of an alloy element is an important factor.

On the other hand, in Patent Literatures 4 to 5, techniques of achieving high strength of ordinary low-carbon steel have been disclosed. Patent Literature 4 discloses a technique proposed in order to solve such a problem that, since tempering property of ordinary low-carbon steel was poor in the previous technique, when a martensite was utilized as an originating structure, an uneven duplex grain structure was produced during an annealing time so that a predetermined high-strength and high-ductility steel material could not be obtained. Therefore, in Patent Literature 4, after ordinary low-carbon steel is tempered to achieve martensite phase of 90% or more, an ultra-fine crystal grain ferrite structure with grain diameters of 1.0 μm or less is obtained by performing cold-rolling with a total reduction ranging from 20% to less than 80% and performing annealing. Patent Literature 5 is the technique which has been proposed by the present applicant, where high strength is achieved by performing working process for elevating internal stress, such as press forming, and achieving refinement and duplex grain sizing of a metal structure of low-carbon steel by heat treatment.

CITATION LIST

Patent Literature

Patent Literature 1: Japanese Patent No. 4005517
Patent Literature 2: JP-A-2005-213640
Patent Literature 3: JP-A-2008-297609
Patent Literature 4: Japanese Patent No. 4189133
Patent Literature 5: JP-A-2008-13835

SUMMARY OF INVENTION

Technical Problem

A demand for reduction of cost or recycling efficiency of resources of a frame member for a seat for an automobile or the like increasingly becomes high from now due to energy saving, accommodation to environmental problems, or the like. Therefore, rather than high strength or high toughness achieved by alloying like the techniques described in Patent Literatures 1 to 3, achievement using ordinary low-carbon steel which elevates the recycling efficiency is desired. Further, these techniques are techniques mainly implemented by iron and steel material manufacturers for producing predetermined high-strength and high-toughness steel from a steel slab and they are not techniques which can be utilized by processing manufacturer which manufactures a seat frame or the like using a commercially-available steel. If the processing manufacturer purchases ordinary steel (common steel) which is inexpensive and easy to work from an iron and steel material manufacturer rather than purchasing a material sold as high-strength and high-toughness steel by the iron and steel material manufacturer and using it, and can achieve high-strength and high-toughness at a required portion of the ordinary steel if necessary, cost reduction of a seat frame can be achieved.

The technique disclosed in Patent Literature 4 is a technique for obtaining desired strength and ductility using ordinary low-carbon steel as a reception material of heat treatment, but it requires a process where, after the whole steel material is martensitized, it is cold-rolled to achieve refinement homogeneously. Therefore, an installation provided with a rolling function is required, which includes a problem with regard to installation cost and manufacturing cost. As apparent from such a fact that ordinary low-carbon steel material with a thickness of 2 mm is exemplified in an Example in Patent Literature 4, in order to achieve high strength and high ductility of steel with a certain thickness, it is necessary to achieve homogeneous refinement in a plate-thickness direction so that a cold-rolling step under predetermined conditions is essential after the martensitization.

In the case of the technique disclosed in Patent Literature 5, refinement and high strength are achieved by heat-treating a thin cold-rolled steel plate and a thin hot-rolled steel plate having a thickness of 1.2 mm and a thickness of 1.0 mm in Examples, but there is room for further improvement of toughness.

The present invention has been made in view of the above circumstances, and a problem to be solved thereof is to provide a structural material the strength and the toughness of which are well-balanced at a high level and particularly suitable for a frame member for a seat for an automobile, an aircraft and the like using low-carbon steel, which is thin ordinary steel (common steel) whose cost is low and recycling efficiency is excellent.

Solution to Problem

In order to solve the above problems, the present invention provides a structural material using thin steel obtained by joining and integrating the thin steel members in apart thereof, in which a reinforced portion formed of a bead, a bracket or a combination of the bead and the bracket is provided in the thin steel, heat treatment is applied to a part thereof after the joining, and by this heat treatment, two types or more of metal structures with different strength and toughness are formed in the thin steel is provided. In the present invention, the thin steel is used as a frame member for a seat, and a configuration in which a peripheral edge part is the joined portion can be used. In the present invention, the entire peripheral edge part is subjected to hemming, and at least the peripheral edge part subjected to hemming is preferably heat-treated. Also, the peripheral edge part subjected to hemming preferably has the thin steel members welded to each other by heat treatment.

Also, in the present invention, the shape of a transmission path of force formed by the reinforced portion and a portion with hardness higher than the portion in a raw material state formed by the heat treatment is preferably configured to be a substantially truss shape. Also, in the present invention, the thin steel is used as a frame member for a seat, and the reinforced portion and the heat-treated portion are preferably provided so that the transmission path of force having the substantially truss shape is formed at least at two spots at a predetermined interval in the frame member.

Also, the present invention preferably has a configuration in which the metal structure of the thin steel formed by the heat treatment includes at least one of the martensite structure, the duplex grain structure, a duplex grain structure containing a hard phase in which a hard phase structure with hardness higher than the duplex grain structure is contained in the duplex grain structure. Also, it is preferable that the joined portion has the martensite structure, the duplex grain structure or duplex grain structure containing a hard phase by heat treatment, and the portion other than the joined portion has a structure with lower hardness and higher toughness than the metal structure of the joined portion including the structure of the raw material state not subjected to heat treatment.

Also, in the present invention, it is preferable that the thin steel is made of thin low-carbon steel, which is ordinary steel having a thickness of 1.2 mm or less, the content of C is 0.01 to 0.12% in mass %, and the remaining part is iron and inevitable impurities. Also, the duplex grain structure is preferably configured by mixing a crystal grain having a grain diameter of 1 μm to less than 5 μm and a crystal grain having a grain diameter of 5 to 30 μm, and the duplex grain structure containing a hard phase is preferably a structure in which island-shaped or chain-shaped martensites having grain diameters of 30 μm or less as the hard phase is diffused in the duplex grain structure in which the crystal grain having a grain diameter of 1 μm to less than 5 μm and the crystal grain having a grain diameter of 5 to 30 μm are mixed.

Advantageous Effect of the Invention

The present invention is a structural material produced by integrally joining thin steel members in a part thereof and, after joining, thermally treating a part thereof so that the heat-treated part differs from the other parts in strength and toughness. That is, the strength of the structural material as a whole has not been uniformly improved by heat treatment but a part having a high strength and a part having low strength are formed, and a structural material, the strength and toughness of which are well-balanced at a high level can be obtained. Since the strength and toughness are well-balanced at a high level, the present invention is particularly suitable for a frame member for a seat for an automobile, an aircraft and the like. Also, by using any of the martensite, the duplex grain structure containing a hard phase, and the duplex grain structure for the metal structure of the part requiring a high strength, while using the structure with lower hardness and higher toughness including the structure in the raw material state for the part requiring extension, the balance between the strength and the toughness is further improved. Particularly, the part subjected to heat treatment and the reinforced portion which is reinforced by forming a bead, by laminating a bracket, or forming a combined part of the both in which the bracket is laminated on the part on which the bead is formed can bear a relatively larger force as compared with the portion in the raw material state without being heat-treated, and this part becomes a transmission path of the force applied to the structural material. By selecting a portion for heat treatment, the portion for forming the bead and the portion for laminating the bracket so that the shape of this transmission path of force has a substantially truss shape, the strength can be further improved while the high toughness is maintained. Also, by using thin low-carbon steel having a thickness of 1.2 mm or less, the duplex grain structure or the duplex grain structure containing a hard phase can be easily set in the structural material by conducting a heat treatment process accompanying rapid heating and rapid cooling several times.

BRIEF DESCRIPTION OF DRAWINGS

FIG. 2 are diagrams for explaining a heat-treatment range of the side frame according to another embodiment of the present invention and a formation position of a bead, in which

DESCRIPTION OF EMBODIMENTS

Figure 1A:
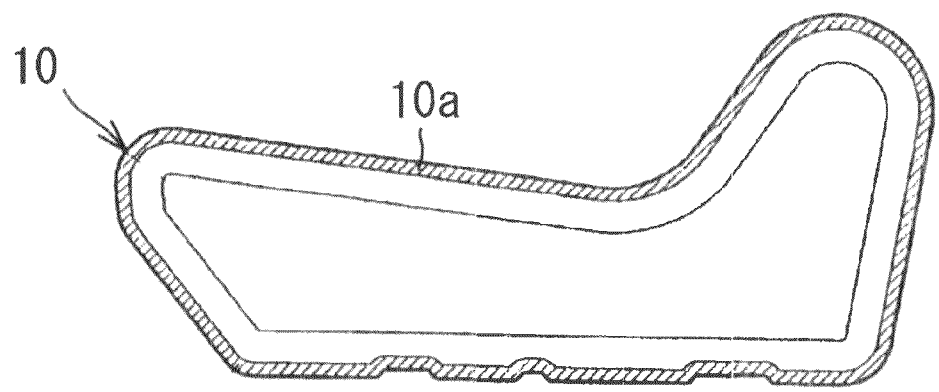
FIG. 1A is a diagram illustrating a side frame as a structural material according to an embodiment of the present invention.
Figure 1B:
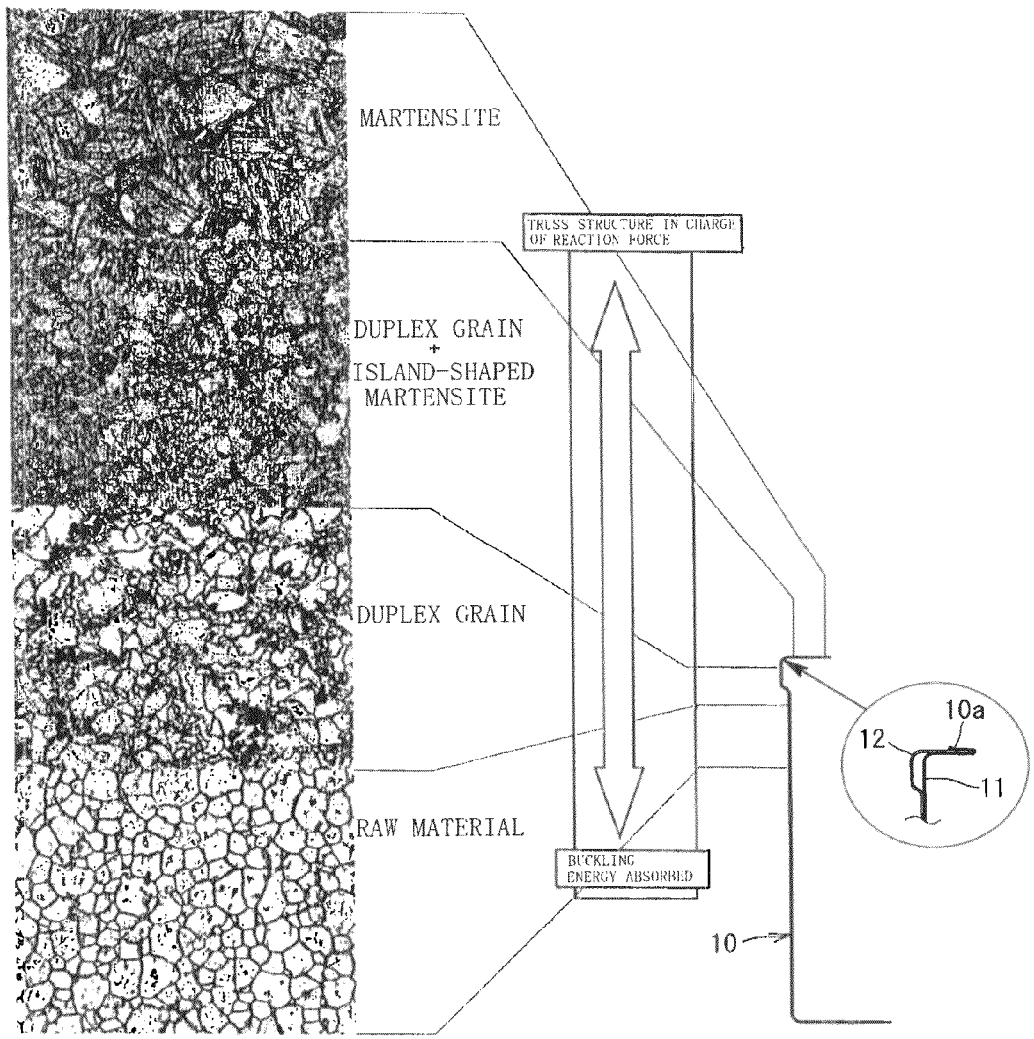
FIG. 1B is a diagram illustrating an example of a microstructure formed on this side frame.
Figure 2A:
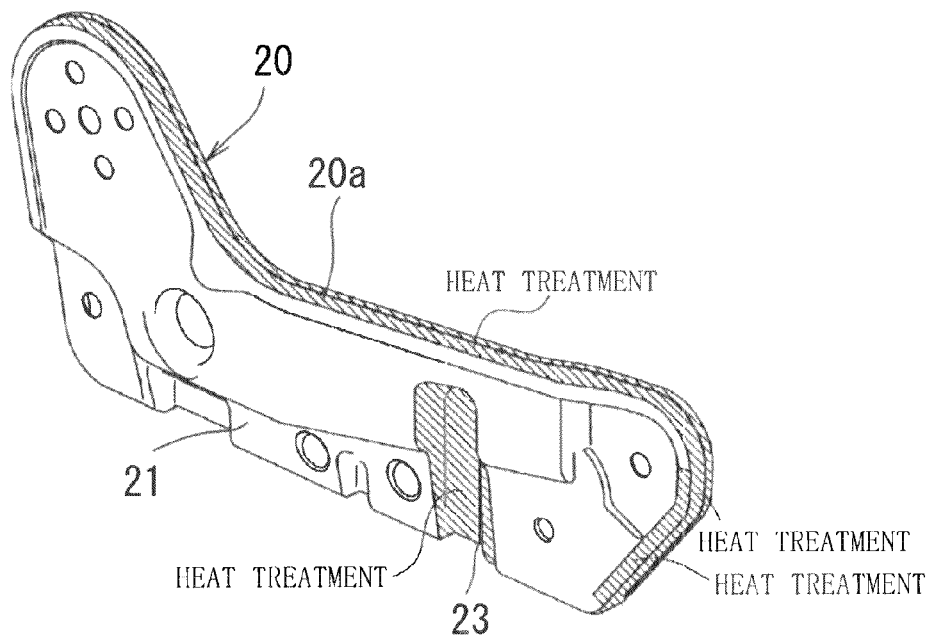
FIG. 2A is a perspective view.
Figure 2B:
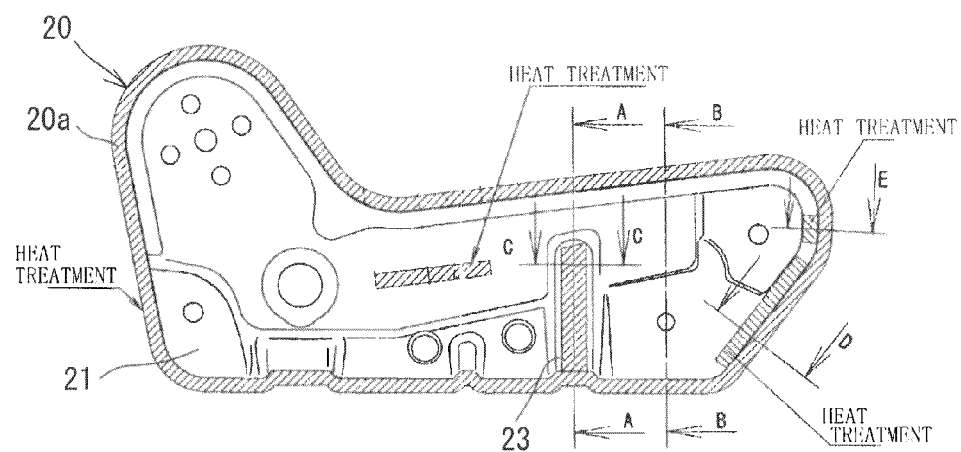
FIG. 2B is a diagram seen from the outer frame side.
Figure 2C:
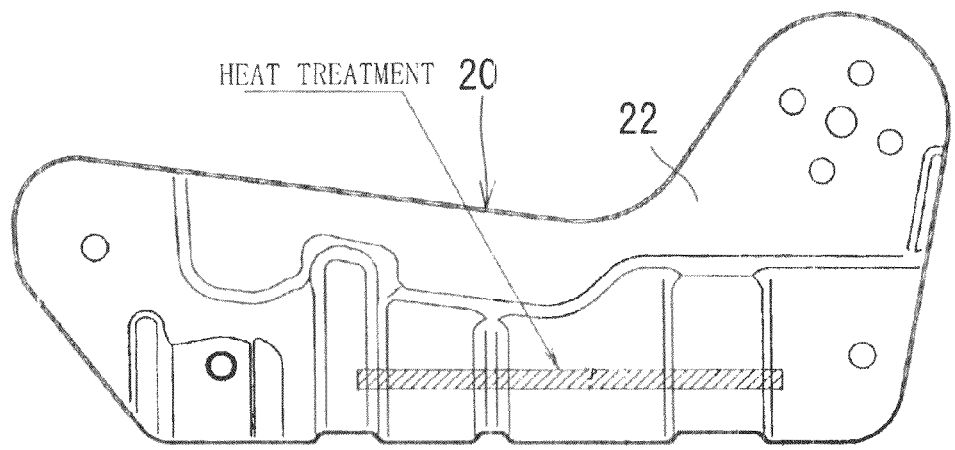
FIG. 2C is a diagram seen from the inner frame side.
Figure 2D:
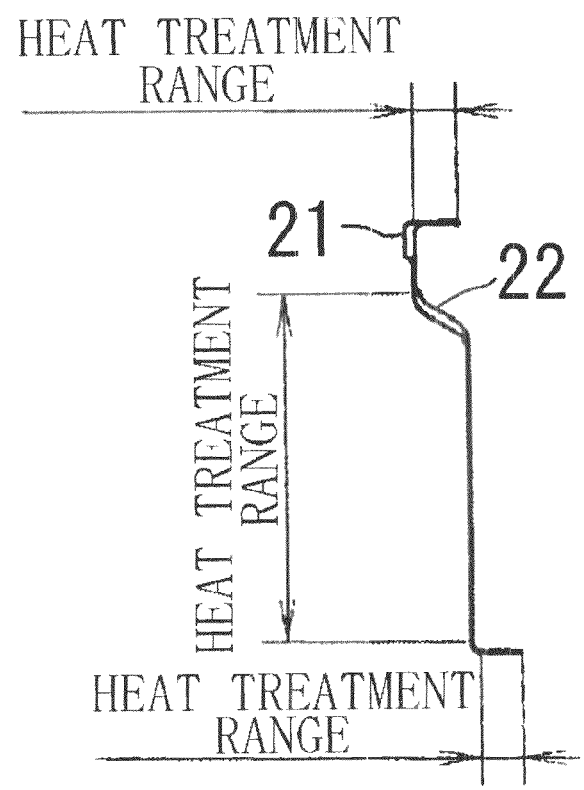
FIG. 2D is an A-A sectional diagram of FIG. 2B.
Figure 2E:
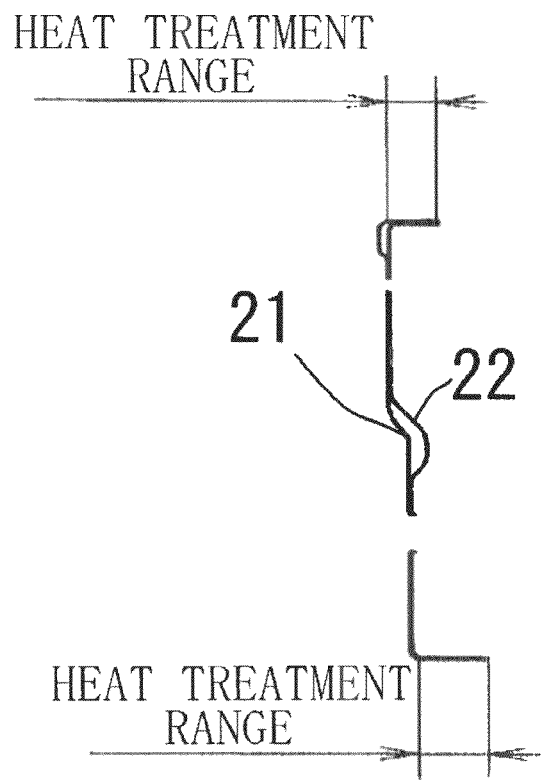
FIG. 2E is a B-B sectional diagram of FIG. 2B.
Figure 2F:
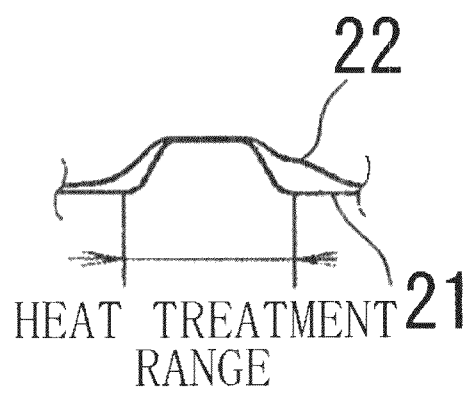
FIG. 2F is a C-C sectional diagram of FIG. 2B.
Figure 2G:
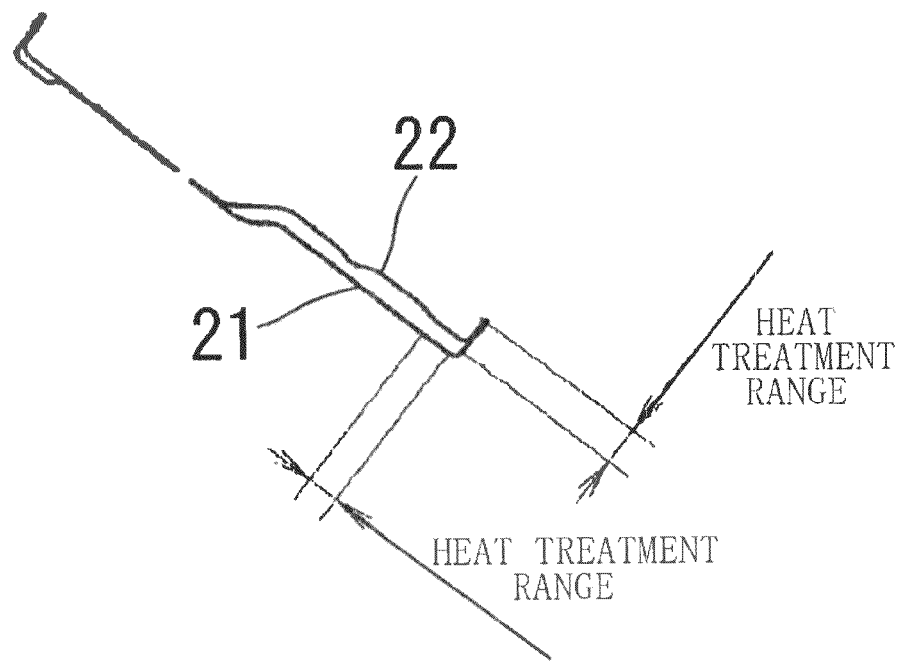
FIG. 2G is a D-line section of FIG. 2B.
Figure 2H:
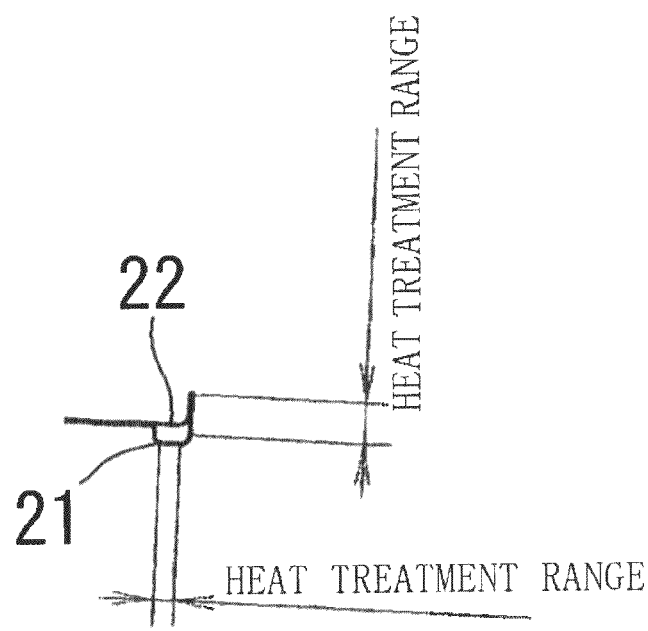
FIG. 2H is an E sectional diagram of FIG. 2B.

Subsequently, embodiments of the present invention will be described. FIG. 1 are diagrams illustrating a side frame 10, which is one of frame members for a seat for an automobile, which is a structural material according to one embodiment of the present invention. This side frame 10 is formed into a predetermined shape by press work using two thin steel members 11 and 12. As illustrated in FIG. 1B, a peripheral edge portion 10a is subjected to hemming which bends an end edge of the thin steel 11 arranged on one side from the inner face side of the thin steel 12 on the other side so as to follow the outer face side by press work or by using a jig for roller hemming and integrated.

In this embodiment, as illustrated in FIGS. 1, the entirety of the peripheral edge portion 10a of the two thin steel members 11 and 12 are integrated by hemming, and the portion subjected to hemming is connected in the ring shape. Thus, a gap is not generated between the one thin steel 11 and the other thin steel 12. Also, by means of hemming, the peripheral edge portion 10a has a three-layer structure and enhanced strength, and generation of a crack from the peripheral edge portion 10a and the like can be prevented.

The side frame 10 is worked into the predetermined shape by press work of the two thin steel members 11 and 12 and then, is heat-treated. At this time, in this embodiment, not all the portions in the thin steel members 11 and 12 are uniformly subjected to heat treatment but the steel members are partially heat-treated or conditions of the heat treatment are made partially different so that the strength and toughness are made different between portions in the structure.

Specifically, in the microstructures of the thin steel members 11 and 12, at least two or more types of structures of a martensite structure, a duplex grain structure, a duplex grain structure containing a hard phase, and a structure in the raw material state not subjected to heat treatment are formed. For example, in FIG. 1B, the peripheral edge portion 10a, which is a joined portion subjected to hemming, is heat-treated so as to become the martensite structure, the portion adjacent to that is heat-treated so as to become the duplex grain structure containing a hard phase, and the portion further adjacent to that is heat-treated so as to become the duplex grain structure. The portion adjacent to the duplex grain structure is a structure in the raw material state not subjected to heat treatment. As a result, the closer the portion is to the peripheral portion 10a, the higher the hardness is, and plays a function of maintaining the shape even if it receives a large impact, while the farther the portion is separated from the peripheral portion 10a, the lower the hardness gradually becomes, and the toughness becomes higher, and if it receives a large impact, the portion with high toughness is deformed and plays a function of relaxing the impact.

In FIGS. 1, the peripheral edge portion 10a subjected to hemming is made a martensite structure, but it is preferably the duplex grain structure containing a hard phase including the martensite structure as a hard phase in an island shaped or chain shaped in order to further improve the toughness while the high hardness is maintained (See FIGS. 14 and 15, which will be described later). In this description, the island-shaped martensite refers to presence of the martensite structure in a dot shape, and the chain-shaped martensite refers to presence of the martensite structure in the linear state. Particularly, the chain-shaped martensite is present in the grain field in a large quantity. The peripheral edge portion 10a subjected to hemming has end edges of the overlapped thin steel members preferably welded (welded) to each other by means of heat treatment.

FIG. 2 show a side frame 20 made of a combination of two thin steel members 21 and 22, in which a bead 23 is formed at a predetermined portion, and a peripheral edge portion 20a is subjected to hemming and integrated similarly to the above. The heat treatment is applied to the whole periphery of the peripheral edge portion 20a and the portion of the bead 23 formed in the vertical direction closer to the front than the vicinity of the substantially center in the longitudinal direction in the thin steel 21 located outside. Also, at a portion located in the vicinity of the substantial center both in the longitudinal direction and the vertical direction of the thin steel 21 located outside, the heat treatment is applied over a predetermined length (See FIG. 2B). The heat treatment is also applied over a predetermined length to a portion closer to the lower edge in the vertical direction of the thin steel 22 located inside (See FIG. 2C).

Figure 3A:
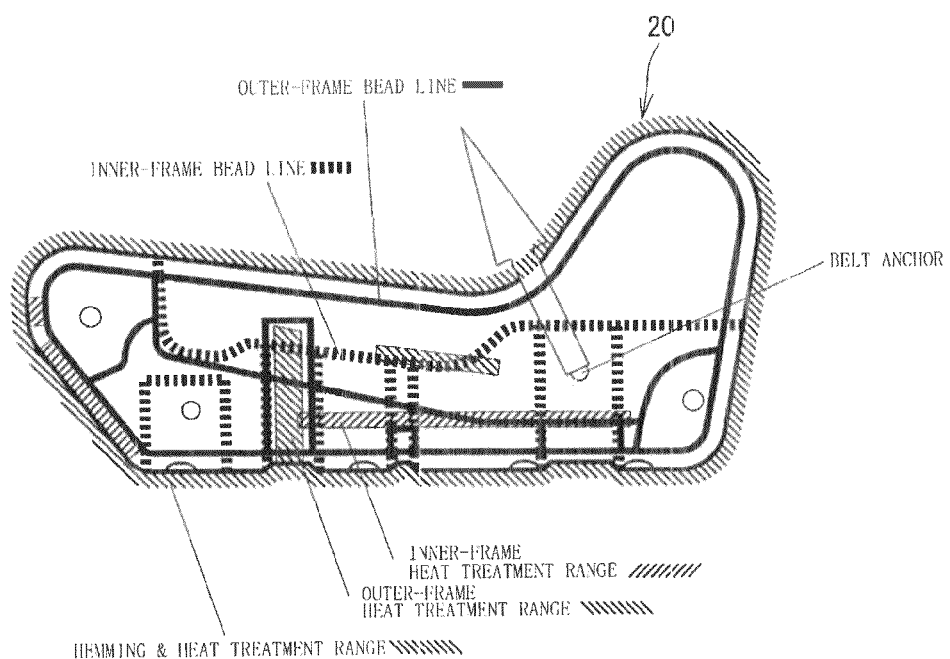
FIG. 3a is a diagram schematically illustrating the heat treatment range of the side frame and the formation position of the bead in FIGS. 2.
Figure 3B:
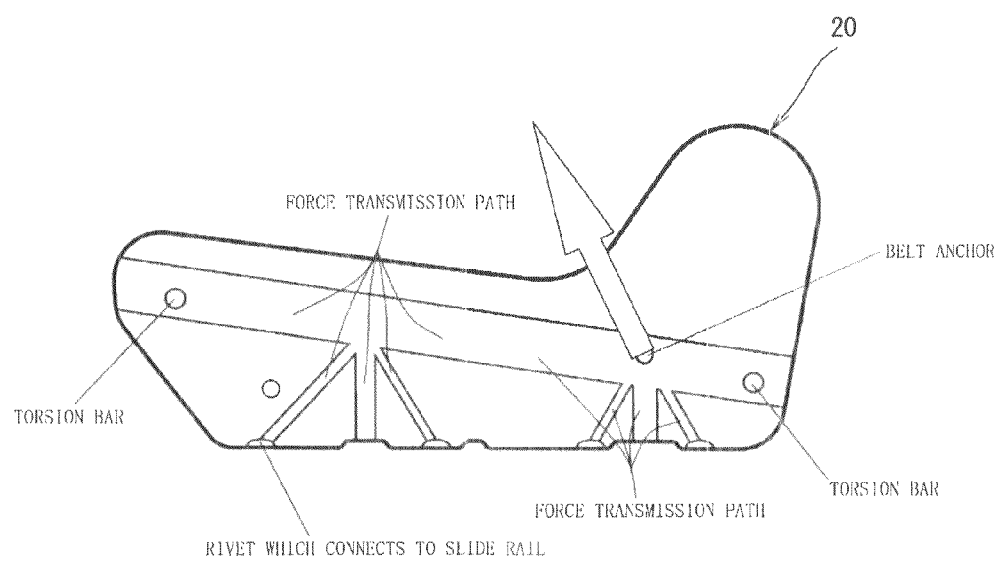
FIG. 3b is a diagram for explaining a force transmission path having a substantially truss shape.
Figure 4A:
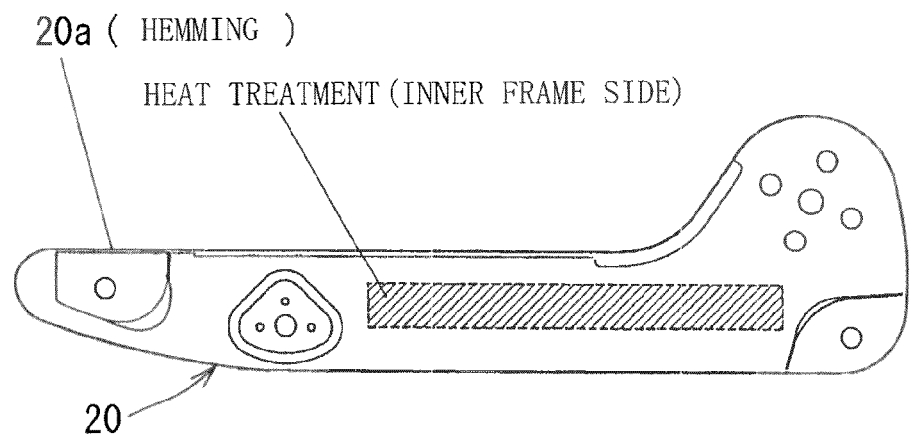
FIGS. 4a and 4b are diagrams illustrating still another example of the heat treatment range of the side frame.
Figure 4B:
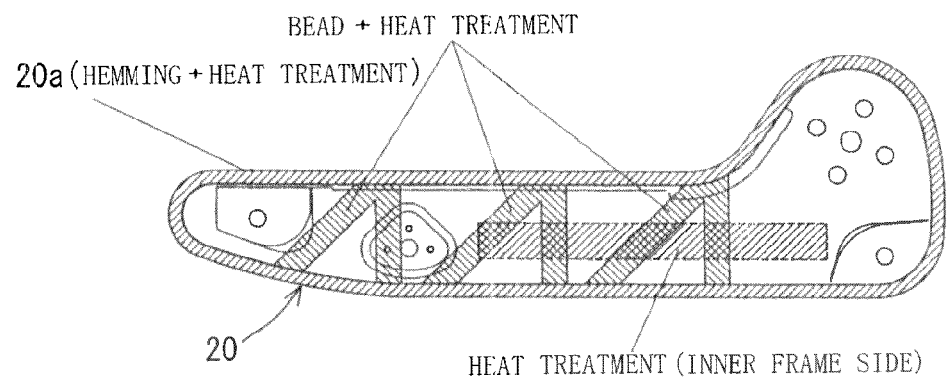

FIG. 3A illustrates a portion where the bead 23 is formed (bead line) and a portion where the heat treatment is applied (heat treatment range) in the inside thin steel (inner frame) 22 and the outside thin steel (outer frame) 21 with regard to the side frame 20 illustrated in FIG. 2, and by forming as above, as illustrated in FIG. 3B, a force applied substantially upward around a belt anchor when an impact is received is transmitted to a torsion bar arranged front and rear of the side frame 20, which is another strength member and a rivet to be fixed to a slide rail on the lower edge portion of the side frame 20 through the bead 23 and the heat treatment range. Since the reinforced portion such as the bead 23 and the heat treatment range have higher strength, they function as a force transmission path but at this time, as illustrated in FIG. 3B, the reinforced portion such as the bead 23 and the heat treatment range are preferably formed so that the force is transmitted to the torsion bar, which is a strength member, and a rivet or the like, and particularly, the force transmission path formed by the reinforced portion such as the bead 23 and the heat treatment range is preferably set to have a substantially truss shape. Among others, as illustrated in FIG. 3B and FIG. 4B, which will be described later, the force transmission path having the substantially truss shape is preferably formed at least two spots (two spots in the example in FIG. 3B and three spots in the example in FIG. 4B) at predetermined intervals on the side frame 20.

By forming the force transmission path formed by the reinforced portion such as the bead 23 and the heat treatment range in the substantially truss shape, the strength of the side frame 23 can be further improved. Therefore, as the side frame illustrated in FIG. 4A, for example, by hemming the peripheral edge portion 20a and by forming the heat treatment range in one line shape along the longitudinal direction of the side frame 20, a seat frame capable of handling a medium load can be designed, or as in the side frame 20 illustrated in FIG. 4B, in addition to the heat treatment range in FIG. 4A, by forming the force transmission path in the substantially truss shape by the peripheral edge portion 20a and the heat treatment range formed in the vertical direction and the diagonal direction between the upper edge and the lower edge, a seat frame capable of handling a high load can be easily designed. By adjusting the heat treatment range, a seat frame with a different specification such as a seat frame handling a medium load or a seat frame handling a high load can be designed even with the totally same frame shape, and contribution can be made to reduction of a manufacturing cost of the seat frame.

Here, as illustrated in FIGS. 5, a reaction force to a load was examined by applying various types of working on a side frame 30 having the same shape formed by using two thin steel members. FIG. 5A is obtained only by hemming a peripheral edge portion 30a of the side frame 30 without applying any heat treatment. FIG. 5B is obtained by applying the heat treatment to the peripheral edge portion 30a in addition to the hemming in FIG. 5A. FIG. 5C is obtained by applying hemming and the heat treatment to the peripheral edge portion 30a and moreover, by forming a bead 33 in the vertical direction between the upper edge and the lower edge so that the force transmission path including the heat-treated peripheral edge portion 30a and the bead 33 has a substantially truss shape in the vicinity of the both sides. FIG. 5D is obtained by further forming a diagonal bead 33a in addition to FIG. 5C and all the force transmission paths including the heat-treated peripheral edge portion 30a and the beads 33 and 33a have a substantially truss shape. FIG. 5E is obtained by applying the heat treatment also to these beads 33 and 33a. In FIG. 5E, the heat treatment is applied to the peripheral edge portion 30a so that the microstructure thereof becomes the duplex grain structure containing a hard phase including the island-shaped or the chain-shaped martensite structure, and the portions where the beads 33 and 33a are formed are heat-treated so that the microstructures thereof become the duplex grain structures made of collection of crystal grains with different grain diameters.

By using a right and left pair of each of the above four side frames 30, a seat in which a three-dimensional fabric is extended between the side frames 30 was made, the front edge portion was pressurized by a pressurizing disk (loader) having a diameter of 200 mm, and a reaction force was measured. If being pressurized as above, each side frame 30 is deformed so that the vicinity of the front edge portion of the side frame 30 is displaced diagonally forward as indicated by a two-dot chain line illustrated in FIG. 5A, and this corresponds to deformation of the side frame 30 at a front collision, and a displacement amount of the pressurizing disk (loader) corresponds to a downward displacement amount of an occupant at the front collision (See FIG. 6). The result is shown in FIG. 7.

Figure 5A:
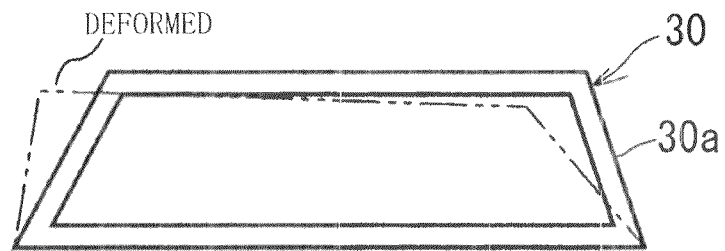
FIGS. 5a to 5e are diagrams for explaining five types of the side frames used for measuring a difference in a reaction force involved with a difference in the heat treatment range and a difference in the bead formation position.
Figure 5B:
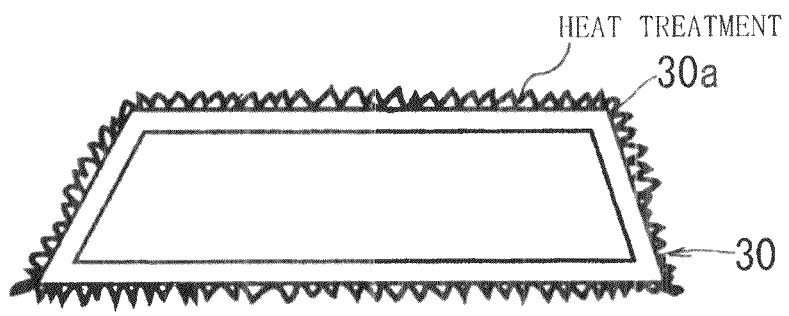
Figure 5C:
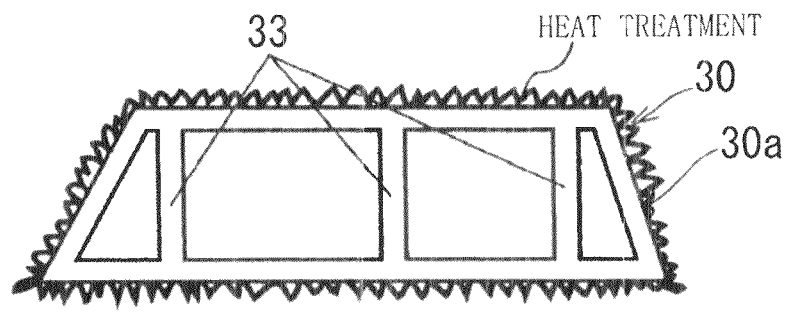
Figure 5D:
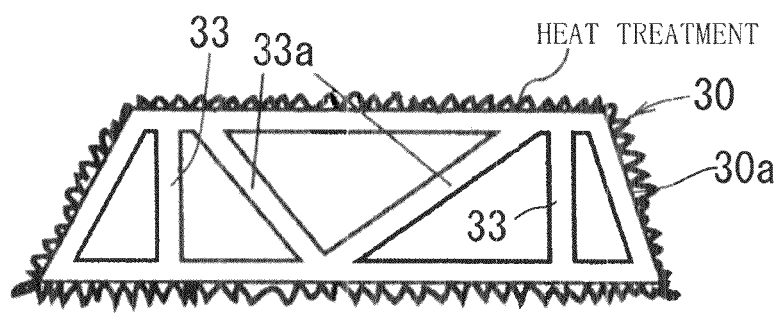
Figure 5E:
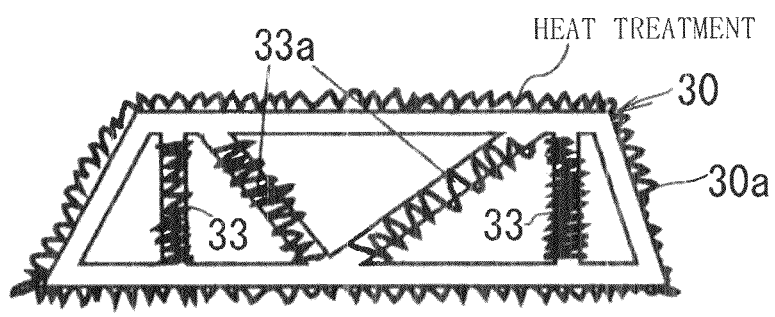
Figure 6:
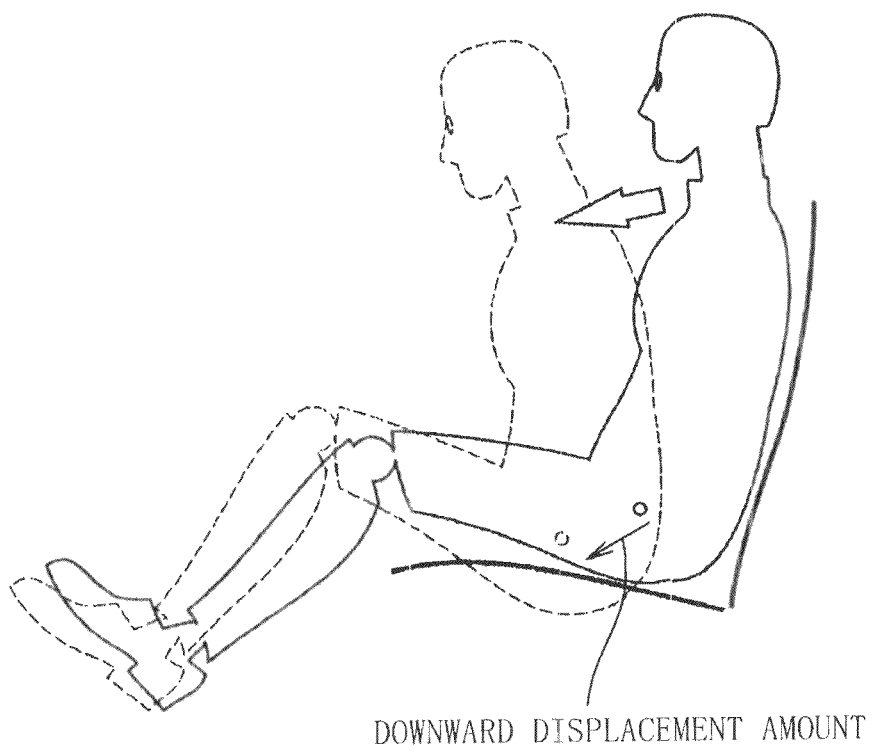
FIG. 6 is a diagram for explaining the relationship between a loader displacement amount and displacement of an occupant.
Figure 7:
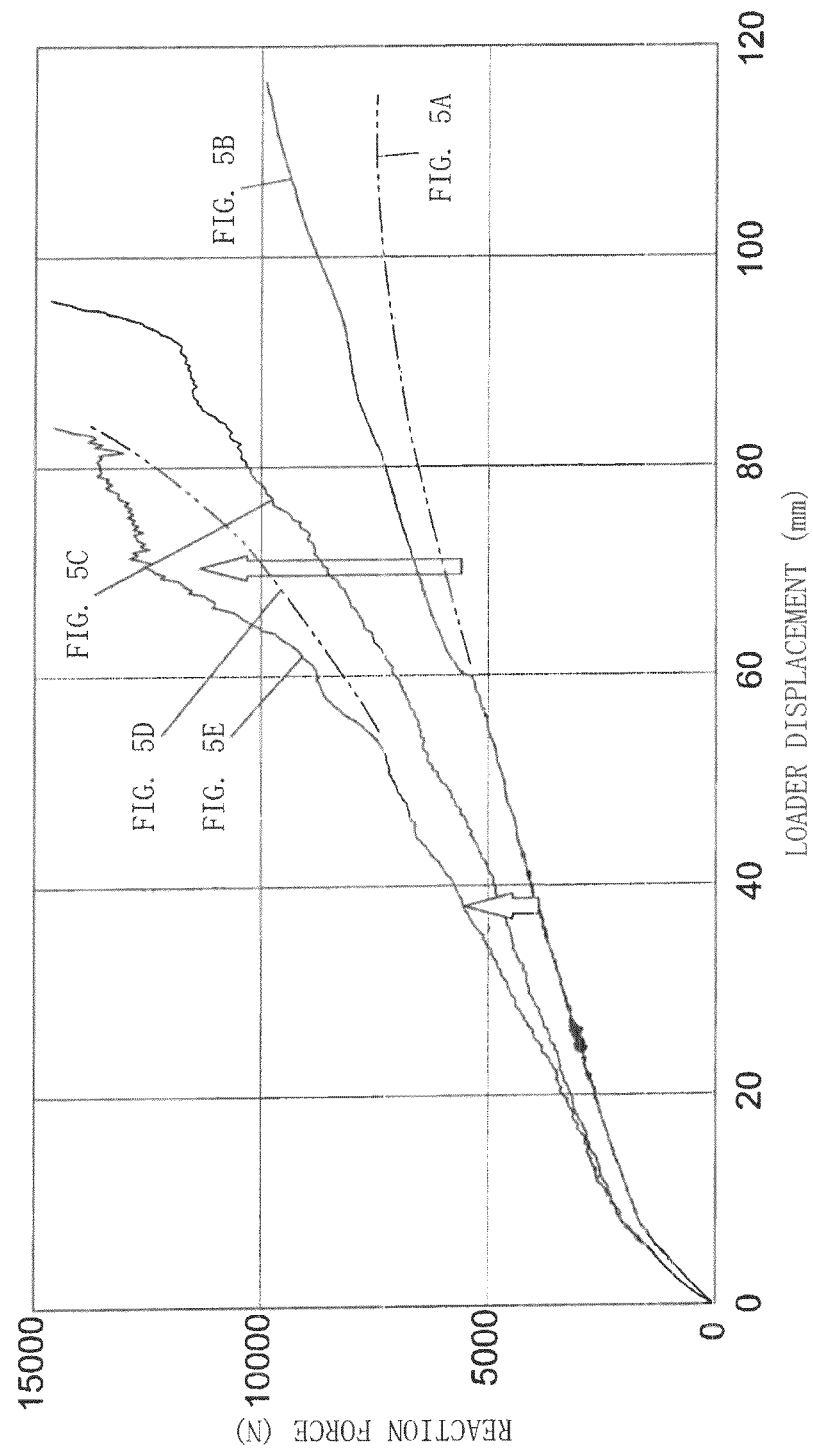
FIG. 7 is a diagram illustrating a change in a load with respect to loader displacement for each seat using the side frames in FIGS. 5a to 5e.

As illustrated in FIG. 7, as compared with FIG. 5A only with hemming, the reaction force is higher in FIG. 5B with the heat treatment applied to the peripheral edge portion 30a. Also, the reaction force is much higher in FIG. 5C in which the bead 33 is also formed and furthermore higher in FIG. 5D in which the force transmission path is formed in the substantially truss shape over the entirety of the side frame 30 than that in FIG. 5C. The reaction force is the highest in FIG. 5E in which the beads 33 and 33a are also heat-treated.

From the above result, it is known that the reaction force can be improved by means of the heat treatment, and the closer to the substantially truss shape the force transmission path including the heat treatment range and the bead is, the higher the reaction force can be improved. In the above-described description, the bead is exemplified as a reinforced portion which forms the force transmission path together with the heat treatment range, but the reinforced portion may be another member such as a bracket mounted so as to be laminated on the frame.

As described above, by applying the heat treatment to a predetermined range and by forming the force transmission path in the substantially truss shape by the heat-treated portion and the reinforced portion such as a bead, the predetermined reaction force (strength) can be made to function even with the structural material using thin steel. Thus, if the same strength is to be achieved, steel thinner than before can be used, and contribution can be made to weight reduction of the structural material. Also, in the present invention, by forming the portion which forms the above-described force transmission path in the substantially truss shape and not applying the heat treatment or providing a reinforced portion such as a bead in the other portions or by executing control such that the microstructure of the thin steel does not become martensites even after the heat treatment, toughness is improved and deformation is allowed in that portion. Therefore, if an impact is received, the shape is held in the above-described portion with high strength, while deformation is allowed in the portion with high toughness, and if it is used as a seat frame, a light-weighted frame having both a function of maintaining an occupant by the shape holding action and a function of absorbing impact by the deformation action can be realized.

Here, thin steel used for the structural material of the present invention is commercially available ordinary steel which is thin and low in carbon (hereinafter referred to as "thin low-carbon steel") and includes both a cold-rolled steel plate and a hot-rolled steel plate. The thickness thereof is 1.2 mm or less. If the thickness of the steel is thicker than that, a large heat source and a large-scaled cooling facility are required for performing the heat treatment, and also homogeneity of crystal grains is required in the plate thickness direction, which makes control difficult, and this is not suitable for a treatment target of the present invention. In thermally treating the structural material having been worked into a predetermined shape by press work or hemming, thin low-carbon steel having the thickness of 1.0 mm or less is preferable since it is suitable for making a duplex grain structure or a duplex grain structure containing a hard phase, and moreover, since more weight reduction can be realized, thin low-carbon steel having the thickness of 0.8 mm or less is more preferable, and thin low-carbon steel having the thickness of 0.5 mm or less is furthermore preferable.

As the above thin low-carbon steel, low-carbon steel whose carbon content is 0.01 to 0.3% and the remaining parts thereof are iron and inevitable impurities can be used, but an extremely low-carbon steel whose carbon content is 0.01 to 0.12% and the remaining parts thereof are iron and inevitable impurities is more preferably used. By using a more inexpensive material with a lower carbon content, a manufacturing cost of the structural material for a seat frame or the like can be reduced. Also, in the present invention, since the strength can be raised even with a low carbon content by limiting the steel to a thin one, alloy elements other than carbon do not have to be added, which is excellent in recyclability. On the other hand, since there is no limitation on components other than the above carbon content, even a recycled steel material in which various types of used steel used as ordinary steel members are mixed and various components other than carbon are mixed can be used. The thin low-carbon steel which is a target to be treated includes both plate-shaped steel members and pipe-shaped steel members.

When martensite structure is to be obtained by thermally treating the above thin low-carbon steel, it is preferably obtained by a process in which the thin low-carbon steel is rapidly heated to 1000° C. or more at the speed of 300° C./second or more or preferably to a temperature in a range of 1000 to 1250° C. and a process in which the steel is held within 10 seconds or preferably within 5 seconds until the temperature falls to a predetermined temperature of 900° C. or more or preferably to a temperature in a range of 1000 to 1100° C. after the rapid heating and then, rapidly cooled at the speed of 300° C./second or more. By rapidly heating the steel to the above temperature, the metal structure of the thin low-carbon steel is austenitized, and the martensite structure is formed by rapid cooling, but as described above, since the thickness of the thin low-carbon steel is 1.2 mm or less, a homogeneous martensite structure which could relatively avoid coarsening by means of so-called super rapid heating and super rapid cooling at 300° C./second or more as above can be formed. The rapid heating speed and the rapid cooling speed are more preferably set to 500° C./second or more as above.

On the other hand, in order to form the microstructure of the thin low-carbon steel of the duplex grain structure or the duplex grain structure containing a hard phase, after the above-described heat treatment to obtain the martensite structure is applied, the two-stage heat treatment is applied as follows. That is, after the above-described process of obtaining the martensites, the heat treatment is preferably applied including a process of rapid heating until the temperature reaches 700° C. or more or preferably a range of 750 to 1050° C. at the speed of 300° C./second or more and a process of holding the steel within 10 seconds or preferably within 5 seconds until the temperature falls to a predetermined temperature of 600° C. or more or preferably a range of 700 to 950° C. after the rapid heating and then, of rapidly cooling the steel at the speed of 300° C./second or more. The rapid heating speed and the rapid cooling speed in this process are both preferably set to 500° C./second or more similarly to the heat treatment when the martensites are formed.

By performing the super rapid heating and super rapid cooling in the two-stage heat treatment process, the martensite structure formed by the one-stage heat treatment is changed, and in the end, the duplex grain structure in which crystal grains with different grain diameters (the "grain diameter" in this description refers to the "equivalent circle grain diameter") ranging from 1 to 30 μm gather together is obtained.

The duplex grain structure is preferably a structure formed of the crystal grains having the grain diameter of 1 μm to less than 5 μm and the crystal grains having the grain diameter ranging from 5 to 30 μm mixed together or more preferably formed of the crystal grains having the grain diameter of 1 μm to less than 5 μm and the crystal grains having the grain diameter ranging from 5 to 20 μm mixed together. If the steel after the heat treatment has the duplex grain structure with different grain diameters instead of homogenous grain diameters, partial elongation occurs in the case of the thin low-carbon steel, whereby steel with high toughness can be obtained. In order to achieve higher strength, the duplex grain structure containing a hard phase in which the hard-phase structure with hardness higher than that of the duplex grain structure is diffused in the duplex grain structure is formed. For example, if the duplex grain structure is a ferrite structure with a different grain diameter, the island-shaped or chain-shaped martensite having the grain diameter of 30 μm or less or preferably of 20 μm or less is preferably diffused in the duplex grain structure. By forming such duplex grain structure containing a hard phase, thin low-carbon steel with high strength and high toughness can be obtained having the strength such that the reaction force due to deflection of a beam caused by a bending moment at a transition point from a plastic region from an elastic region in the bending characteristic is 1.5 times or more larger than that before the heat treatment and the yield point in the tensile characteristic is 1.5 times or more larger than that before the heat treatment and the breaking elongation of 1.5 times or more larger than the breaking elongation in a state in which the thin low-carbon steel is heat-treated in order to form the martensites.

As a heat treating apparatus which conducts the above-described heat treatment, a high-frequency induction heating apparatus is preferably used. Also, a high-frequency induction heating apparatus in which a heating portion (in the case of an induction heating apparatus, a coil forming the induction heating portion) and a cooling portion (a cooling water supplying section which supplies cooling water) are moved relatively at a predetermined speed with respect to the thin low-carbon steel to be heat-treated and a work supporting section. As a result, even in a small-scaled facility, the rapid heating and rapid cooling can be realized in the above-described extremely short time. The moving speeds of the heating portion (in the case of the induction heating apparatus, a coil forming the induction heating portion) and the cooling portion of the high-frequency induction heating apparatus are preferably set in a range within 30 mm/seconds, or more preferably set in a range within 18 mm/second. The work (thin low-carbon steel) is supported by the work supporting section, and if the work has a plate shape, the work supporting section can be formed of a plate-shaped table on which the plate-shaped work can be loaded or a grasping section which grasps the end portion of the work (See FIGS. 8A to 8C). Also, if the work has a pipe shape, since it is preferable that the treatment is performed while the work is being rotated, the work supporting section preferably has a grasping section which can grasp the pipe-shaped object, and this grasping section is preferably configured rotatable.

Figure 8A:
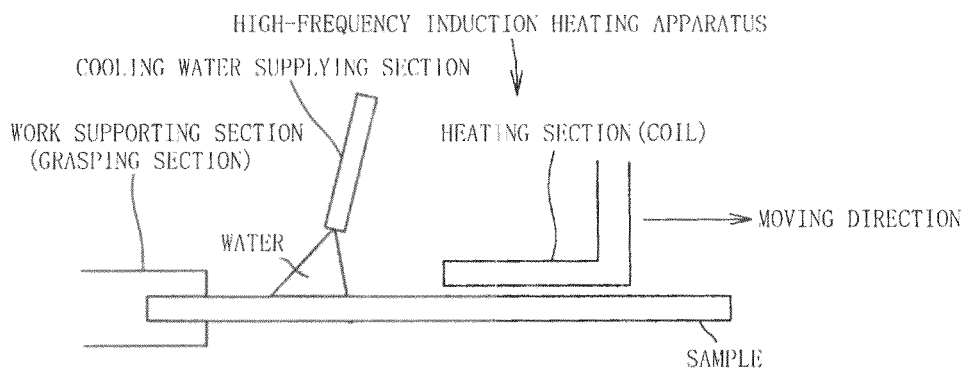
FIG. 8A is a diagram illustrating an example of an outline configuration of a high-frequency induction heating apparatus.

As the high-frequency induction heating apparatus, as illustrated in FIG. 8A, an apparatus provided with the heating portion and the cooling water supplying section in the order can be used. Only one set of this heating portion and the cooling water supplying section is provided, and when the one-stage heat treatment of forming the martensite structure is conducted, the heating portion is controlled to be the above-described predetermined temperature for the treatment. After the treatment of forming the marntensitic structure has been conducted, the heating portion is controlled again by the high-frequency induction heating apparatus illustrated in FIG. 8A to be a temperature lower than that in the above-described process for the heat treatment. Here, in the structural material of the present invention, as in the side frame 10 illustrated in FIG. 1, for example, the peripheral edge portion 10*a* is made of martensite, while the other portions are made of the duplex grain structure containing a hard phase, the duplex grain structure or in the raw material state. Therefore, in the two-stage heat treatment, the peripheral edge portion 10a which has become a desired structure, that is, martensite, by the one-stage heat treatment, is excluded from the targets to be heated, and control is executed such that the heating portion (coil) gets close only to the portions forming the duplex grain structure containing a hard phase or the duplex grain structure. Alternatively, in the heating treatment in which the martensite is formed, a coil having the length and the shape which reach the peripheral edge portion 10a and the portion adjacent to it is used as the heating portion (coil), and in the two-stage heat treatment, a coil having such length and the shape that the peripheral edge portion 10a is removed can be used. As the heating portion, instead of the coil conducting the high-frequency induction heating, a laser may be attached so that each rapid heating treatment is conducted by laser heating.

Figure 8B:
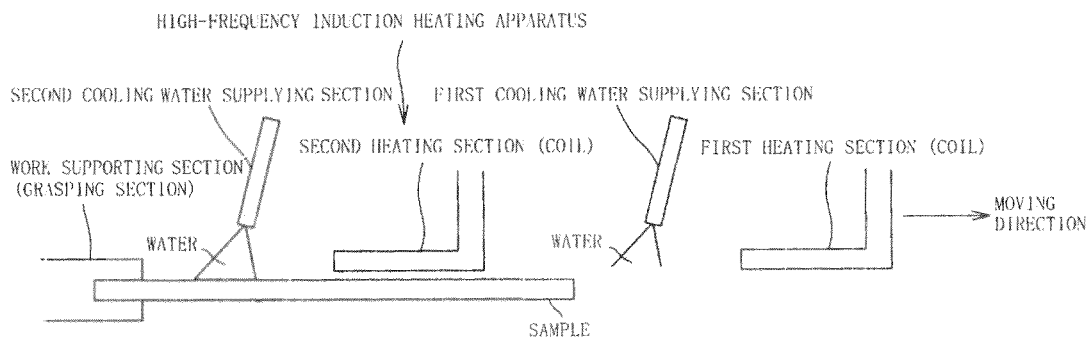
FIG. 8B is a diagram illustrating an outline configuration of a preferable example of the high-frequency induction heating apparatus.

The high-frequency induction heating apparatus is not limited to those provided only with one set of the heating portion and the cooling water supplying section as above but as illustrated in FIG. 8B, the apparatus may be configured to be provided with a first heating section (coil) and a first cooling water supplying section which perform the one-stage heat treatment for forming the martensite structure (hereinafter referred to as the heat treatment in the "first process") and a second heating section (coil) and a second cooling water supplying section which perform the two-stage heat treatment (hereinafter referred to as the heat treatment in the "second process") in this order. In this case, by forming the first and second heating sections (coils) in different shapes, the peripheral edge portion is subjected only to the first-process treatment, while the other required portions can be subjected to the first and second processes continuously.

Figure 8C:
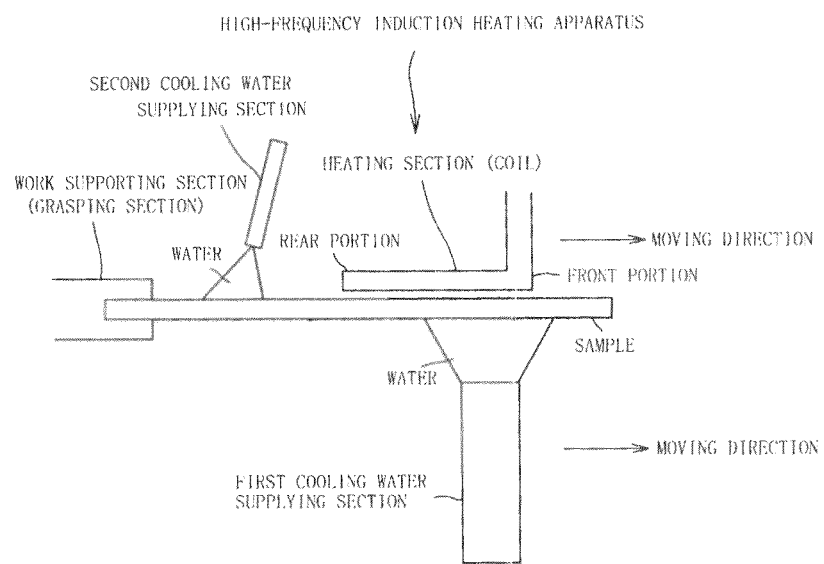
FIG. 8C is a diagram illustrating an outline configuration of the high-frequency induction heating apparatus which has one heating portion that performs rapid heating in a first process and a second process and conducts rapid cooling treatment from both sides of a work.

Also, as illustrated in FIG. 8C, by using a coil having the length longer than the predetermined length along the moving direction of the heating portion (coil) or a lengthy coil having the length of approximately 5 to 10 cm, for example, the heating portion can function both as the first heating section in the first process and the second heating section in the second process. That is, this high-frequency induction heating apparatus is an apparatus used exclusively for the portion where the duplex grain structure or the duplex grain structure containing a hard phase is formed by the first process and the second process. The heating portion is arranged on one face side of the work (thin low-carbon steel), and on the opposite side of the work, a cooling portion (first cooling water supplying section) corresponding to the vicinity of the front portion in the moving direction of the heating portion is provided. As a result, the vicinity of the front portion of the heating portion in the moving direction performs the rapid heating treatment in the first process and the first cooling water supplying section corresponding thereto performs the rapid cooling treatment in the first process. The heating portion and the first cooling water supplying section move as a set thereof. Then, a portion on the work which has been subjected to the rapid heating and rapid cooling treatments in the first process is rapidly reheated by the vicinity of a rear portion of the heating portion. As a result, the rapid heating treatment in the second process is executed. After that, the cooling portion (second cooling water supplying section) arranged in the rear in the moving direction of the heating portion at a predetermined interval rapidly cools the portion which has been rapidly heated by the vicinity of the rear portion of the heating portion and the rapid cooling processing in the second process is executed.

Subsequently, the conditions of the one-stage heat treatment in which the above-described martensite structure is formed (hereinafter referred to as the "first process") and the conditions of the two-stage heat treatment in which the duplex grain structure or the duplex grain structure containing a hard phase is formed (hereinafter referred to as the "second process") were checked through various tests.

TEST EXAMPLE 1

In Test Example 1, the heat treatments in the first process and in the second process were conducted for each of the following samples, and the duplex grain structure or the duplex grain structure containing a hard phase was formed:

(1) Sample 1: a cold-rolled steel plate of ordinary steel (SPCC)
   Chemical Components (%): C=0.04, Si=0.02, Mn=0.26, P=0.011, and S=0.006
   Thickness: 0.5 mm, Width: 100 mm, and Length: 200 mm (2) Sample 2: a cold-rolled steel plate of ordinary steel (SPCC)
   Chemical Components (%): C=0.037, Si=0.004, Mn=0.19, P=0.013, S=0.012, sol Al=0.015, Cu=0.02, Ni=0.02, and B=14 (PPM)
   Thickness: 0.5 mm, Width: 100 mm, and Length: 200 mm (3) Sample 3: a cold-rolled steel plate of ordinary steel (JSC440)
   Chemical Components (%): C=0.12, Si=0.06, Mn=1.06, P=0.022, and S=0.005
   Thickness: 0.6 mm, Width: 100 mm, and Length: 200 mm As the heat treating apparatus, a high-frequency induction heating apparatus provided with one set of the heating portion and the cooling water supplying section shown in FIG. 8A was used, where after the heat treatment in the first process was performed by the heating portion and the cooling-water supplying portion, each Sample was left down to room temperature, and the heat treatment in the second process was then performed by the same high-frequency induction heating apparatus. As the treatment condition, the following two treatment conditions (A) and (B) were adopted.

Figure 9:
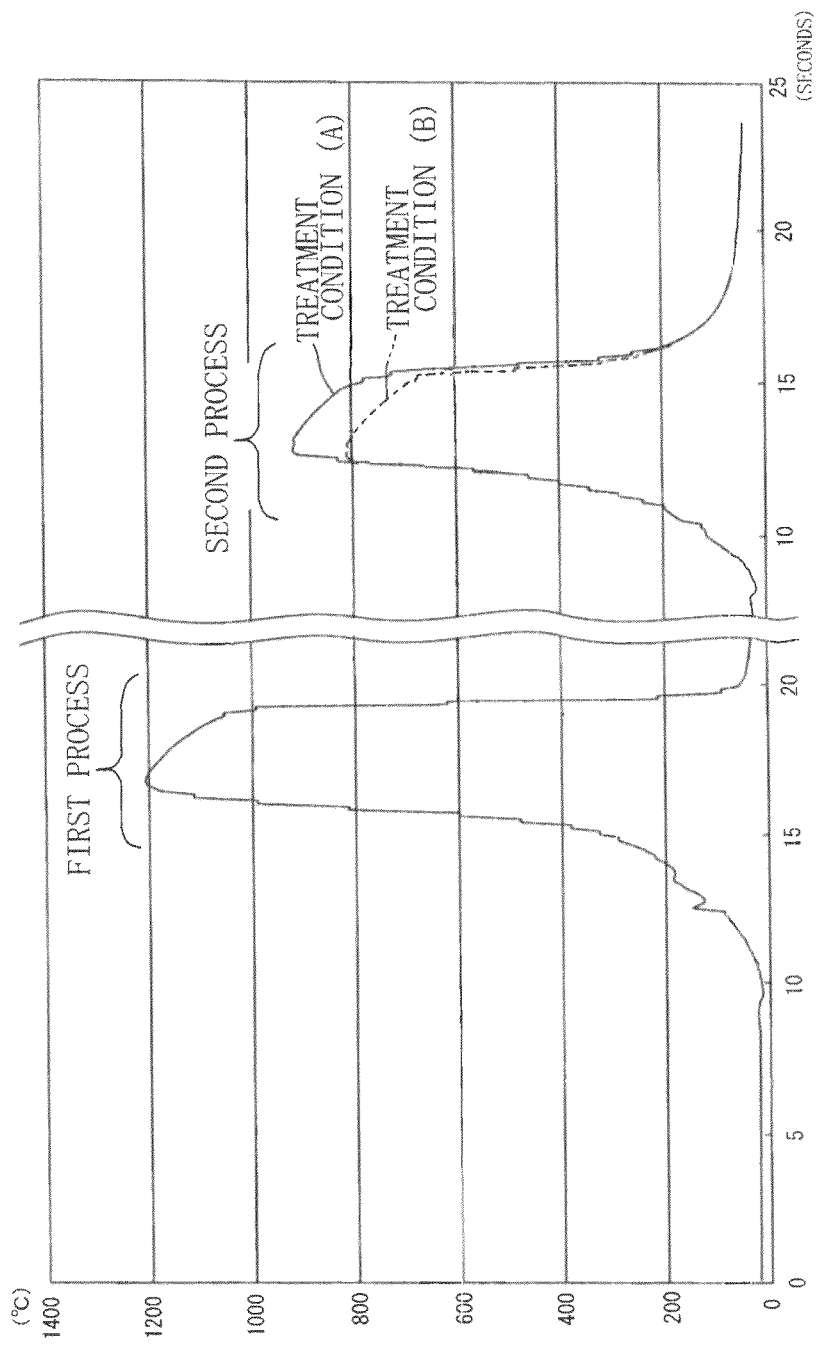
FIG. 9 is a diagram illustrating temperature conditions of treatment conditions (A) and (B) in Test Example 1.

Treatment Condition (A)
First Process
(1) Moving speed of the heating portion and the cooling water supplying section: 800 mm/min.
(2) The coil of the heating portion was adjusted to 120 A. A sample was pre-heated in accordance with gradual temperature rising as the heating portion came relatively close to the sample, but the sample was rapidly heated from 400° C. to 1200° C. in about one second. Thereafter, the sample was held for about 2.5 seconds until the temperature thereof dropped to 1050° C., and it was then rapidly cooled to 200° C. or lower in about 0.5 seconds by supplying cooling water from the cooling water supplying section (a solid line in the first process shown in FIG. 9).

Second Process
(1) Moving speed of the heating portion and the cooling water supplying section: 800 mm/min.
(2) After the sample dropped to a room temperature, it was set in the high-frequency induction heating apparatus again. A current to be made to flow in the coil of the heating portion was adjusted to 100 A, and after the sample was pre-heated to 400° C., it was rapidly heated up to 900° C. in about 0.5 seconds. The sample was held for about 2.5 seconds until the temperature dropped to 800° C., it was then rapidly cooled down to about 200° C. or lower in about 0.5 seconds by supplying cooling water from the cooling water supplying section, and it was thereafter left until the temperature reached the room temperature (a solid line in the first process shown in FIG. 9).

Treatment Condition (B)
First Process
(1) Moving speed of the heating portion and the cooling water supplying section: 800 mm/min.
(2) The coil of the heating portion was adjusted to 120 A. A sample was pre-heated according to gradual temperature rising as the heating portion came relatively close to the sample, but the sample was rapidly heated from 400° C. to 1200° C. in about one second. Thereafter, the sample was held for about 2.5 seconds until the temperature thereof dropped to 1050° C., and it was then rapidly cooled to 200° C. or lower in about 0.5 seconds by supplying cooling water from the cooling water supplying section (a solid line in the first process shown in FIG. 9).
Second Process
(1) Moving speed of the heating portion and the cooling water supplying section: 1000 mm/min.
(2) After the sample dropped to a room temperature, it was set in the high-frequency induction heating apparatus again. A current to be made to flow in the coil of the heating portion was adjusted to 100 A, and after the sample was pre-heated to 400° C., it was rapidly heated up to 800° C. in about 0.5 seconds. The sample was held for about 2.5 seconds until the temperature dropped to 700° C., it was then rapidly cooled down to about 200° C. or lower in about 0.5 seconds by supplying cooling water from the cooling water supplying section, and it was thereafter left until the temperature reached the room temperature (a broken line in the second process shown in FIG. 9).

Figure 10A:
FIGS. 10A to 10C are electron microscope photographs of microstructures of Samples 1 to 3 which were treated under treatment conditions (A) and (B) in Test Example 1.
Figure 10B:
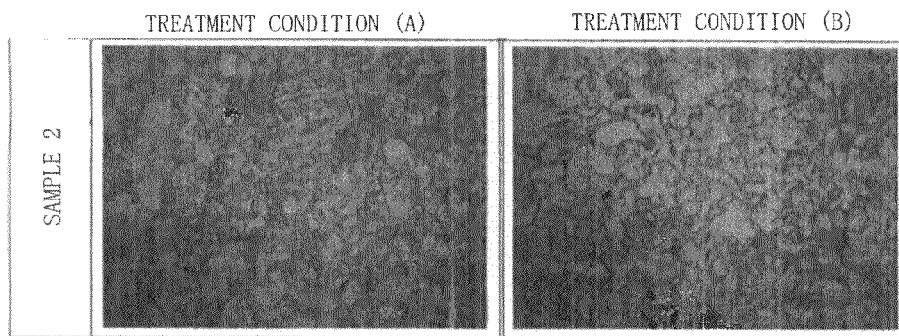
Figure 10C:
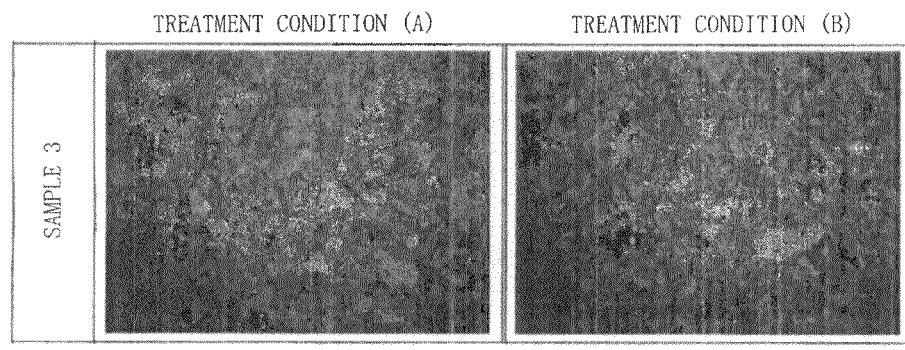
Figure 13A:
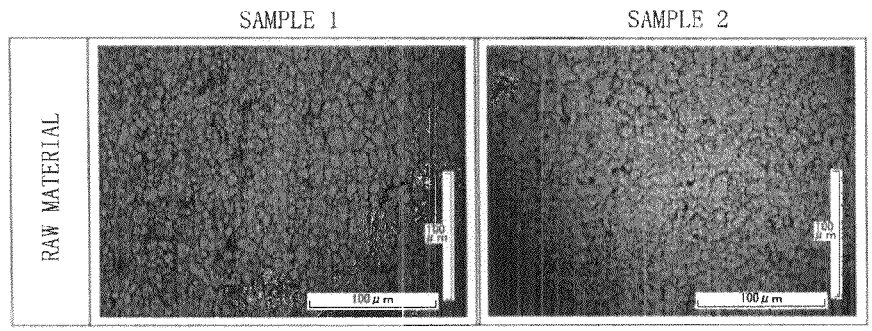
FIG. 13A is an electron microscope photograph of a microstructure of Sample 1 and Sample 2 in the raw material state.

FIG. 10A are electron microscope photographs of microstructures of Samples 1 which were treated in accordance with the treatment conditions (A) or (B) and which were observed by cutting the vicinity of their central portions in their longitudinal directions, and FIG. 10B are electron microscope photographs of microstructures of the Samples 2 which were treated in accordance with the treatment conditions (A) or (B) and which were observed by cutting the vicinity of their central portions in their longitudinal directions (with regard to the microstructures of the raw material states of Samples 1 and Samples 2, see the column "Raw Material" in FIG. 13A). FIG. 10C are electron microscope photographs of microstructures of Samples 3 which were treated in accordance with the treatment conditions (A) or (B) and which were observed by cutting the vicinity of their central portions in their longitudinal directions.

From FIG. 10A, Sample 1 which was treated in accordance with the treatment condition (A) was composed of a duplex grain structure of a ferrite structure of fine grains having grain diameters of 1 μm to less than 5 μm and a ferrite structure of grains having grain diameters of 5 to 30 μm, where island-shaped martensites having a grain diameter of 30 μm or less were contained in the duplex grain structure in an amount of less than 5%. On the other hand, in the case of the treatment condition (B) where the moving speed was faster than that of the treatment condition (A) and the heating temperature in the second process was lower than that of the treatment condition (A), Sample 1 was composed of a duplex grain structure of a ferrite structure of fine grains having grain diameters of 1 μm to less than 5 μm and a ferrite structure of grains having grain diameters of 5 to 20 μm, and crystal grains of Sample 1 according to the treatment condition (A) were slightly larger than those of Sample 1 according to the treatment condition (B).

In the case of FIG. 10B, Sample 2 which was treated in accordance with the treatment condition (A) contained island-shaped martensites having grain diameters of 30μ or less in an amount of about 20% in addition to a duplex grain structure of a ferrite structure of fine grains having grain diameters of 1 μm to less than 5 μm and a ferrite structure of grains having grain diameters of 5 to 30 μm. In the case of the treatment condition (B), Sample 2 was composed of a duplex grain structure of a ferrite structure of fine grains having grain diameters of 1 μm to less than 5 μm and a ferrite structure of grains having grain diameters of 5 to 20 μm.

Samples 3 contained C in an amount of 0.12% which was more than those of Samples 1 and Samples 2. Accordingly, as shown in FIG. 10C, both Samples which were treated according to the treatment condition (A) or (B) contained island-shaped martensites having grain diameters of 30μ or less in addition to a duplex grain structure of a ferrite structure of fine grains having grain diameters of 1 μm to less than 5 μm and a ferrite structure of grains having grain diameters of 5 to 30 μm, where the island-shaped martensites were contained in an amount of about 50 to 60%.

TEST EXAMPLE 2

Figure 11:
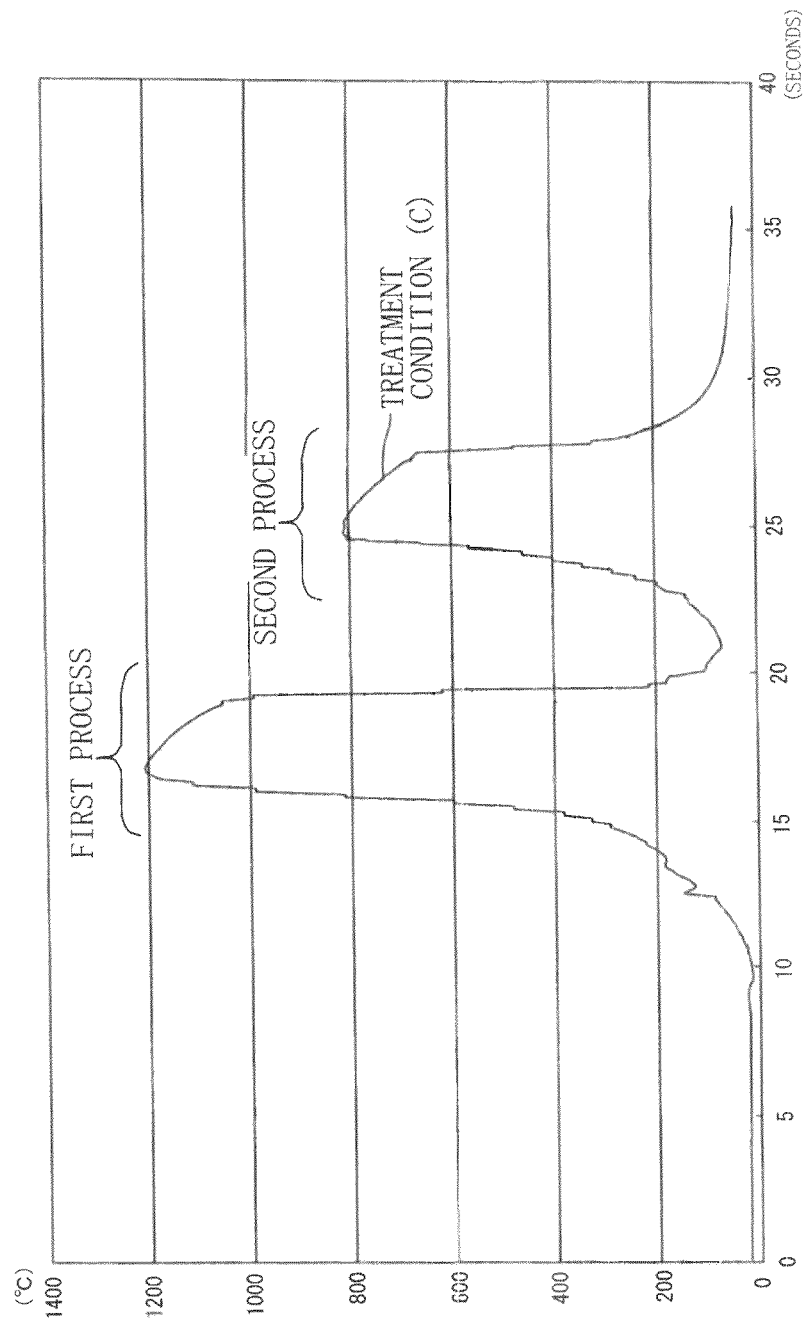
FIG. 11 is a diagram illustrating the temperature conditions of a treatment condition (C) in Test Example 2.

The above Sample 1 was heat-treated by a high-frequency induction heating apparatus provided with a heating portion comprising a lengthy coil with a length of 6 cm shown in FIG. 8C and first and second cooling water supplying sections. A treatment condition was as the following (C).
Treatment Condition (C)
First Process
(1) Moving speed of the heating portion and the first and second cooling water supplying sections: 800 mm/min.
(2) The coil of the heating portion was adjusted to 120 A. A sample was pre-heated according to gradual temperature rising as the heating portion came relatively close to the sample, but the sample was rapidly heated from 400° C. to 1200° C. in about one second. Thereafter, the sample was held for about 2.5 seconds until the temperature thereof dropped to 1050° C., and it was then rapidly cooled to 200° C. or lower in about 0.5 seconds by supplying cooling water from the cooling water supplying section (a solid line in the first process shown in FIG. 11).
Second Process
(1) Moving speed of the heating portion and the first and second cooling water supplying sections: 1000 mm/min.
(2) A current to be made to flow in the coil of the heating portion was adjusted to 90 A and Sample 1 whose temperature was about 200° C. was rapidly heated up to 800° C. in about 0.5 seconds by the rear portion of the heating portion. Sample 1 was held for about 2.5 seconds until its temperature dropped to 700° C., it was then rapidly cooled to 200° C. or less in about 0.5 seconds by supplying cooling water from the second cooling water supplying section, and thereafter it was left until its temperature reached room the temperature (a solid line in the second process in FIG. 11).

Figure 12:
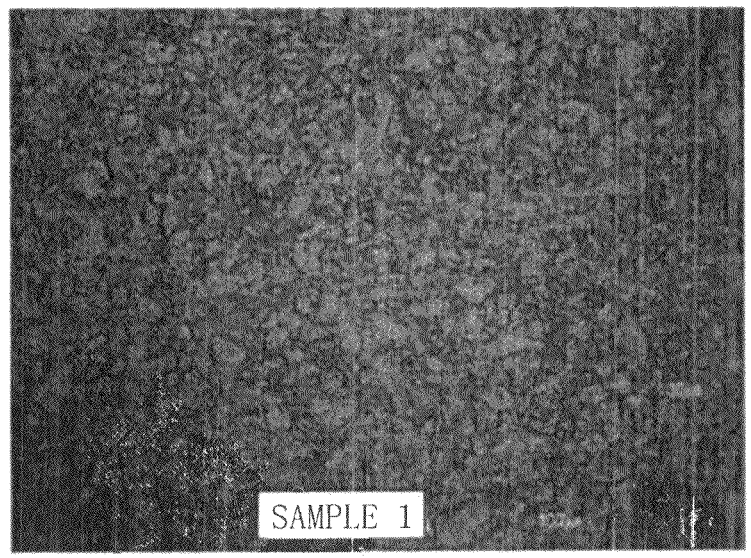
FIG. 12 is an electron microscope photograph of the microstructure of Sample 1 which was treated under the treatment condition (C) in Test Example 2.

FIG. 12 is an electron microscope photograph of a microstructure of Sample 1 which was treated in accordance with the treatment condition (C) and which was observed by cutting the vicinity of its central portion in its longitudinal direction. From FIG. 12, Sample 1 which was treated in accordance with the treatment condition (C) included island-shaped martensites having grain diameters of about 5 to 10 μm formed in an amount of about 20% in addition to a duplex grain structure of a ferrite structure of fine grains having grain diameters of 1 μm to less than 5 μm and a ferrite structure of grains having grain diameters of 5 to 20 μm.

TEST EXAMPLE 3

Figure 13B:
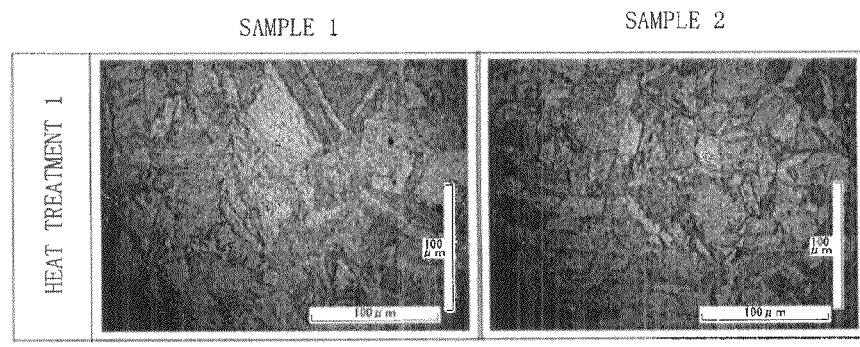
FIGS. 13B and 13C are electron microscope photographs of each microstructure of Sample 1 and Sample 2 which were treated in Test Example 3.
Figure 13C:
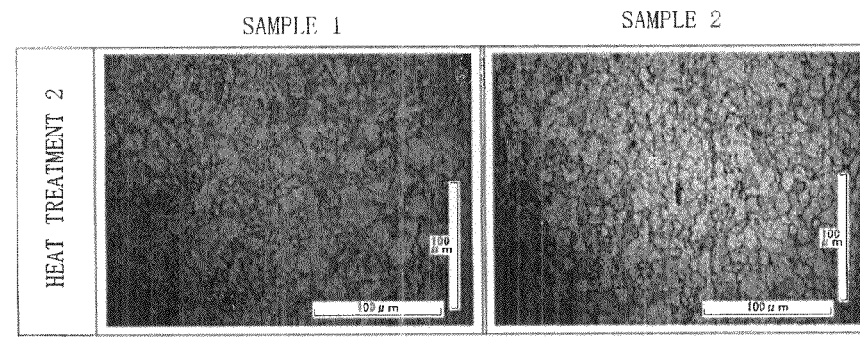

The high-frequency induction heating apparatus provided with one set of the heating portion and the cooling water supplying section illustrated in FIG. 8A was used as the heat treating apparatus, and heat treatment where rapid heating and rapid cooling were only once performed was performed to Sample 1 and Sample 2. Specifically, a case in which after rapid heating was performed up to 1200° C. by the heating portion (coil), rapid cooling was performed by the cooling water supplying section (Heat Treatment 1) and a case in which after rapid heating was performed up to 900° C. by the heating portion (coil), rapid cooling was performed by the cooling water supplying section (Heat Treatment 2) were tested. Electron microscope photographs of microstructures of respective Samples which were observed by cutting the vicinity of their central portions in their longitudinal directions are shown in FIG. 13. In these figures, the term "raw material" indicates microstructures of Sample 1 and Sample 2 before the heat treatment is performed thereto.

From FIG. 13A, both Sample 1 and Sample 2 in their raw material states have approximately uniform ferrite structures with grain diameters of 10 μm or less. Both Sample 1 and Sample 2 in the states of "Heat Treatment 1" illustrated in FIG. 13B have coarse martensite structures with grain diameter of 20 to 100 μm. Sample 2 in the "Heat Treatment 2" state illustrated in FIG. 13C has a duplex grain structure of a ferrite structure of fine grains having the grain diameter of 1 μm to less than 5 μm and a ferrite structure having the grain diameter of 5 to 30 μm. In the case of Sample 1, island-shaped martensites having the grain diameter of about 5 to 10 μm are formed in addition to a duplex grain structure of a ferrite structure of fine grains having the grain diameter of 1 μm to less than 5 μm and a ferrite structure having the grain diameter of 5 to 30 μm.

Figure 14:
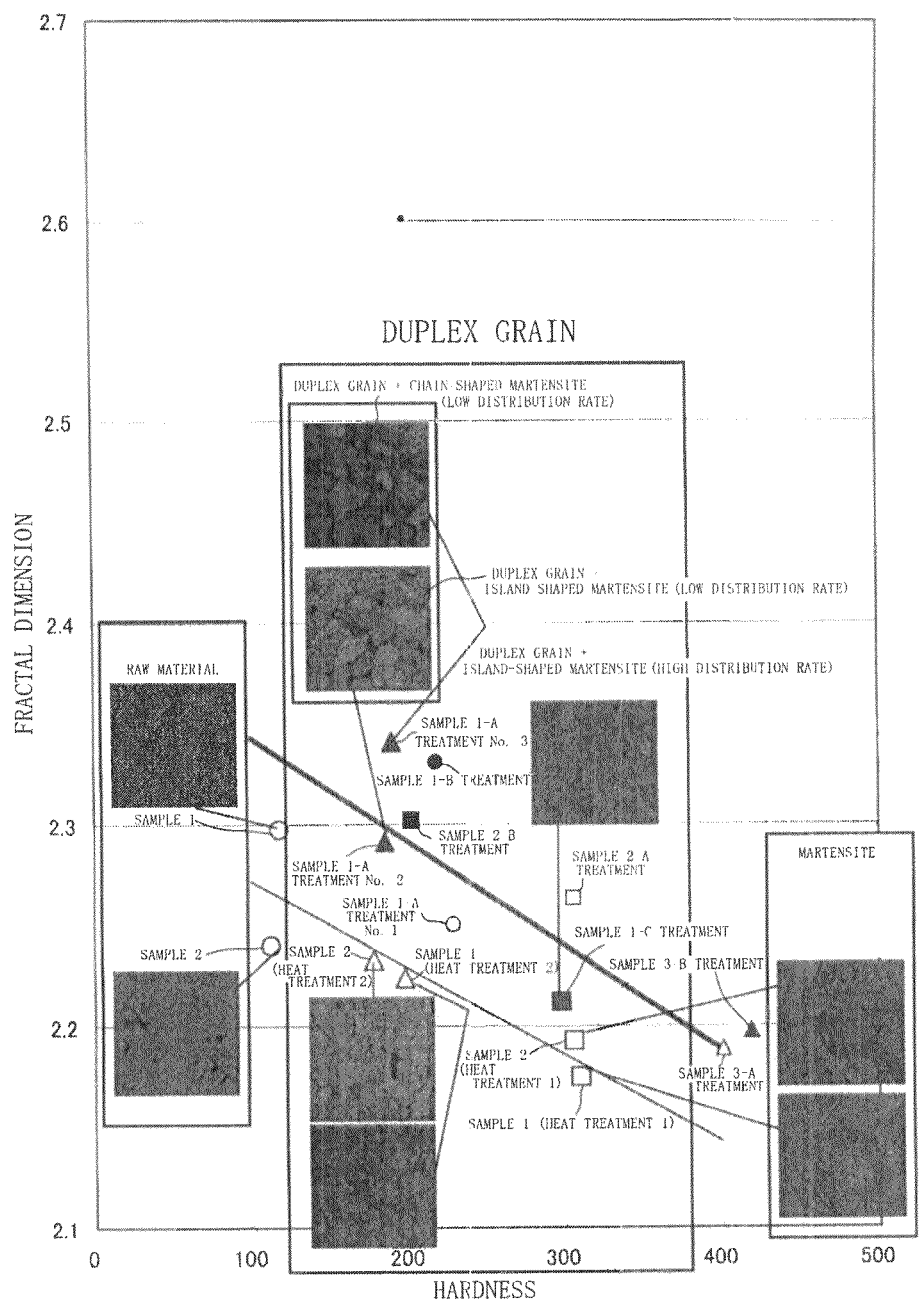
FIG. 14 is a graph illustrating the relationship between hardness (Hv) and fractal dimension of Sample 1 to Sample 3 which were treated in Test Example 1 to Test Example 3.

FIG. 14 is a graph where an average hardness (Hv) is represented on a horizontal axis while fractal dimension of a grain diameter is represented on a vertical axis, and respective values of respective Samples 1, 2 and 3 of Test Example 1 to Test Example 3 are plotted. Sample 1-A treatment in Test Example 1 shows a result of three test pieces No. 1 to 3. Electron microscope photographs of each Sample are also shown. As apparent from this figure, in the case of Sample 1 and Sample 2, ones where the duplex grain structure was formed or island-shaped or chain-shaped martensites were formed in the duplex grain structure in both Test Examples 1 and 2 were higher in fractal dimension than Samples 1 and 2 (Heat treatment 1) where martensite structures were formed in Test Example 3. It was found that, with regard to inclinations obtained by least-square method, shown in FIG. 14, Test Example 1 tended to be higher in fractal dimension than Test Examples 3 as a whole, and by performing rapid heating treatment and rapid cooling treatment multiple times as in Test Example 1, even in ones with same duplex grain structure formed or with same island-shaped martensites formed in a duplex grain structure, Samples 1 and 2—A treatment (treatment according to the treatment condition (A)) and Samples 1 and 2—B treatment (treatment according to the treatment condition (B)) in Test Example 1 could be made finer in grain diameter and higher in toughness than Samples 1 and 2 (Heat Treatment 2) in Test Example 3. Further, even in the case of Sample 1—C treatment (treatment according to the treatment condition (C)) of Test Example 2, though hardness becames high, fractal dimension was approximately equal to the case of Sample 1 (Heat Treatment 2) formed with the duplex grain structure in Test Example 3.

Also, very high hardness was obtained in Sample 3 of Test Example 1. This is because a dispersion percentage of island-shaped martensites is high, and Sample 3 of Test Example 1 is inferior to Samples 1 and 2—A treatment and Samples 1 and 2—B treatment in toughness. However, when C content is more than that of Sample 3 of Test Example 1, there is a concern that the toughness is further inferior, so that it is more desirable that the C content is set to 0.12% or less.

Figure 15:
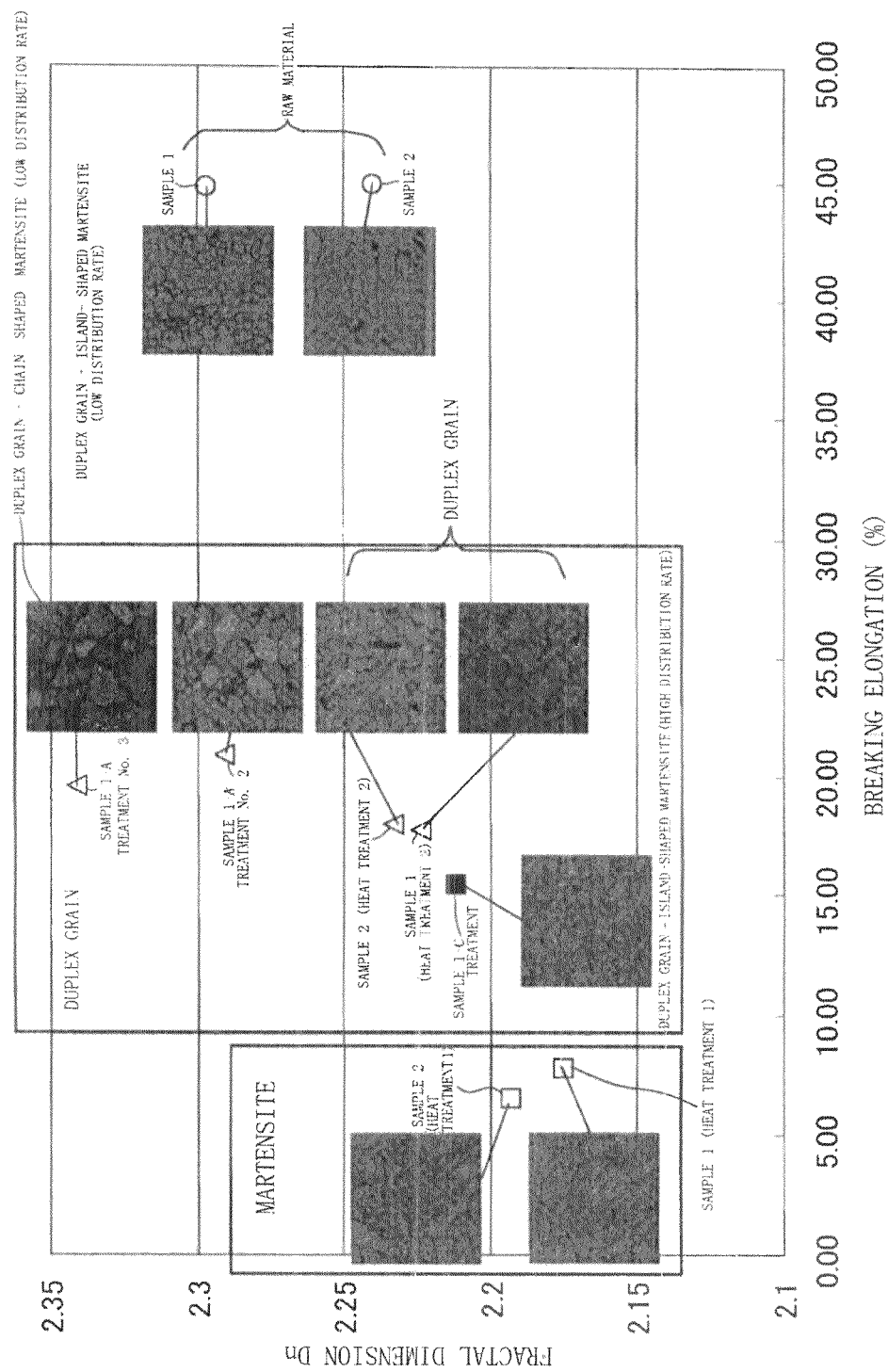
FIG. 15 is a graph illustrating the relationship between breaking elongation and fractal dimension of Sample 1 to Sample 2 which were treated in Test Example 1 to Test Example 3.

FIG. 15 is a graph in which breaking elongation (%) is represented on a horizontal axis while fractal dimension of a grain diameter is represented on a vertical axis, and respective values of respective Samples 1 and 2 of Test Example 1 to Test Example 3 are plotted. For example, "Sample 1—A treatment—No. 2" indicates one in which island-shaped martensites are contained in the above-described duplex grain structure in a low amount of less than 5% and whose breaking elongation is 21.4%. "Sample 1—A treatment—No. 3" indicates one which is composed of the above-described duplex grain structure containing the martensites dispersed in the chain-shaped in the amount less than 5% and whose breaking elongation is 19.64%. The breaking elongation, which is one of indexes of toughness, tends to become large according to the increase of the fractal dimension, so that a correlation between the above-described fractal dimension and toughness became apparent. Then, it was also found from FIG. 15 that Samples 1 and 2 which were subjected to rapid heating treatment and rapid cooling treatment multiple times in Test Example 1 and Test Example 2 could improve their toughness as compared with Samples 1 and 2 in Test Example 3 which were subjected to rapid heating treatment and rapid cooling treatment only once. From this fact, by selecting one of grain structures for a portion having the structural material such as the peripheral edge portion of the side frame, for example, while referring to this fractal dimension and by applying the above-described heat treatment according to the selection, partial improvement of the toughness or partial improvement of the strength of the side frame can be easily accomplished.

TEST EXAMPLE 4

(Bending Test)

Figure 16A:
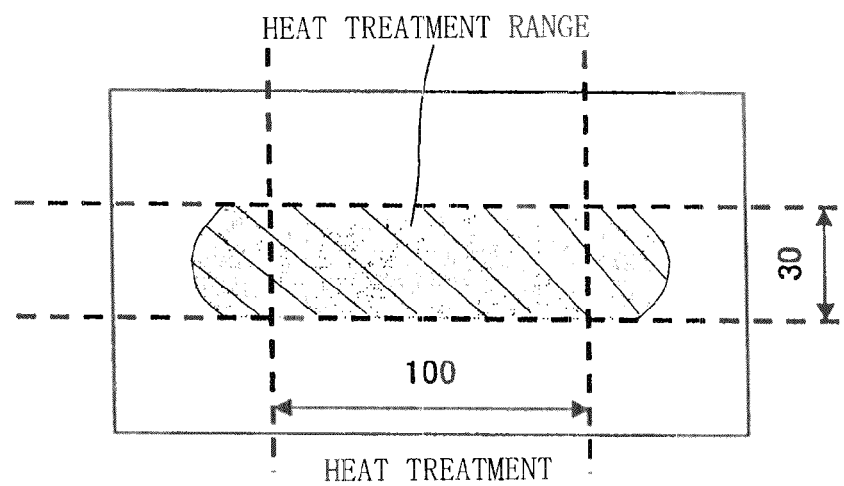
FIGS. 16A and 16B are diagrams for explaining a measuring method of a bending test in Test Example 4.

Three kinds of samples having the same chemical components as those of the cold-rolled steel plate of the ordinary steel of Sample 1 described above and whose thicknesses were 0.5 mm, 0.8 mm, and 1.0 mm, respectively, were heat-treated such that the heat treatment covers their ranges of a width of 30 mm and a length of 100 mm (see FIG. 16A). In the heat treatment, each treatment included in the first process and the second process was performed according to the above "Treatment Condition (A)".

Figure 16B:
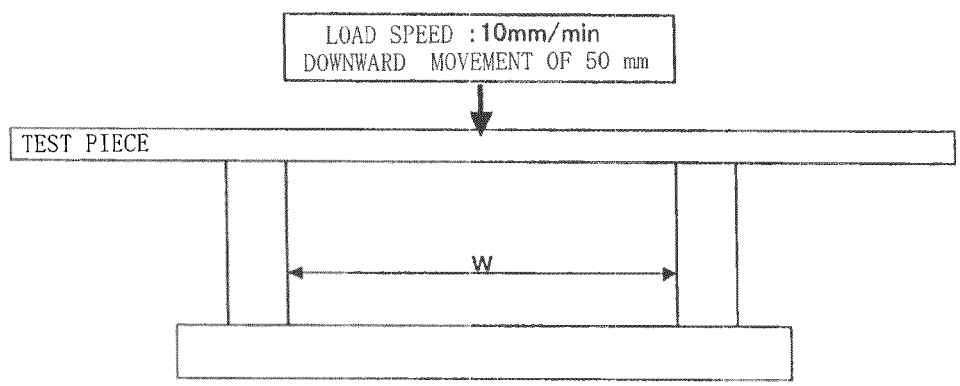

As shown in FIG. 16B, each of the above-described Samples was set on the supporting base supporting the vicinities of both ends thereof, and a load was applied on a central portion of the heat-treated range of each Sample in a longitudinal direction thereof at a loading rate of 10 mm/min by a crosshead. Respective ones of non-heated ones (represented as "Raw Material" in FIG. 17) and heat-treated ones ("Heat Treatment" in FIG. 17) of all Samples were tested. The test result is shown in FIG. 17.

Figure 17:
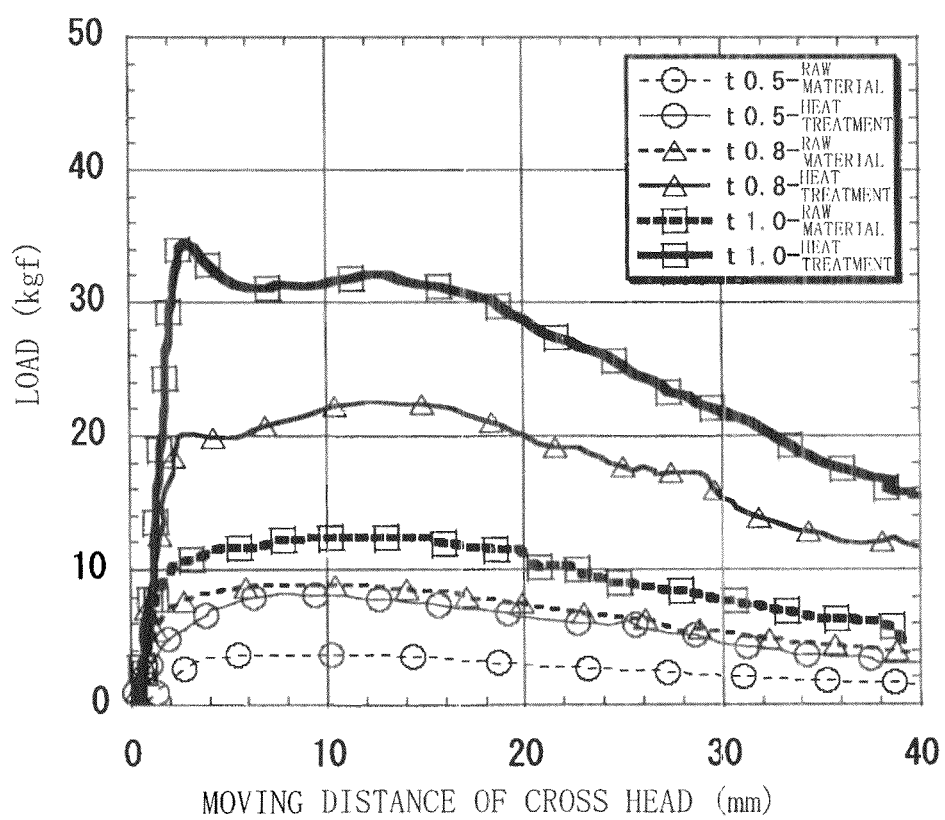
FIG. 17 is a graph illustrating a measurement result of the bending test in Test Example 4.

As apparent from FIG. 17, with regard to a reaction force due to deflection of a beam caused by a bending moment at a transition point from an elastic region to a plastic region in a bending property, Sample with a thickness of 0.5 mm which was heat-treated is about twice the Sample before heat treatment, and Samples with a thickness of 0.8 mm and with a thickness of 1.0 mm which were heat-treated are about 2.5 times those before heat treatment. Accordingly, by using Sample with a thickness of 0.5 mm which was heat-treated instead of a raw material with a thickness of 0.8 mm or by using Sample with a thickness of 0.8 mm which was heat-treated instead of a raw material with a thickness of 1.0 mm, contribution to weight reduction of a seat frame or the like can be achieved.

TEST EXAMPLE 5

(Tensile Test)

Figure 18:
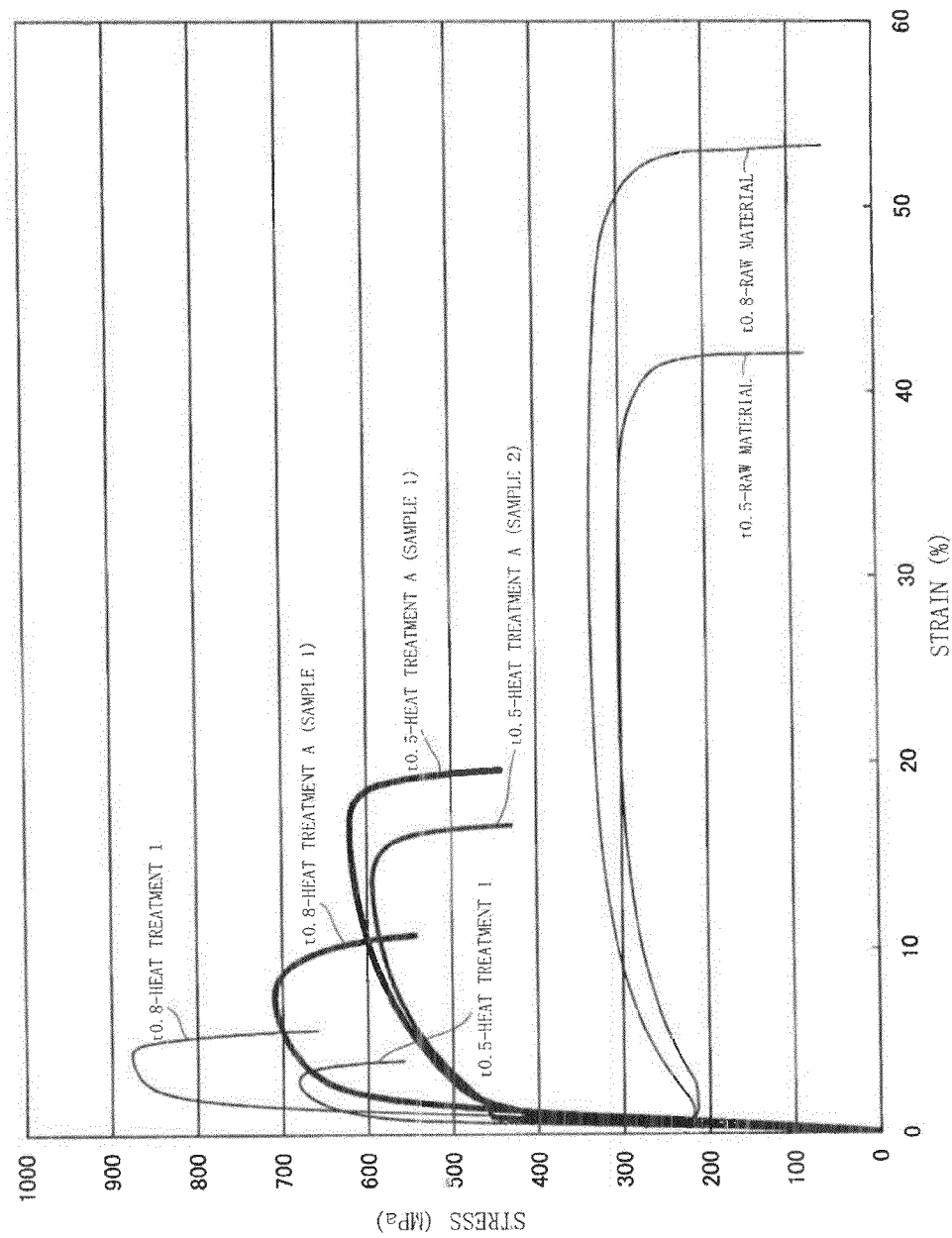
FIG. 18 is a graph illustrating a measurement result of a tensile test in Test Example 5.

Tests were performed by grasping end portions of samples with a length of 150 mm and a width of 30 mm in their longitudinal directions by a chuck. The samples were Samples 1 with a thickness of 0.5 mm and with a thickness of 0.8 mm which were used in the above-described bending tests and Sample 2 with a thickness of 0.5 mm. The result is shown in FIG. 18. In FIG. 18, "Heat treatment—A (Sample 1)" and "Heat Treatment—A (Sample 2)" were heat-treated in accordance with the above-described treatment condition (A) of Test Example 1, in which the microstructure was the duplex grain structure or it was the duplex grain structure with island-shaped martensites formed therein. "Heat treatment 1" is a sample which was heat-treated according to the above-described condition of "Heat Treatment 1" of Test Example 3 and which resulted in martensite structure.

As a result, the yield point (proof stress) of the sample formed with the martensite structure of Heat Treatment 1 in Test Example 3 is high but the breaking elongation thereof is low. On the other hand, the yield points (proof stresses) of "Heat treatment—A (Sample 1)" and "Heat Treatment—A (Sample 2)", when having a thickness of 0.5 mm, were about twice that of a raw material before heat treatment and they were lower than that of one formed with a martensite structure, but the breaking elongations thereof were at least three times that of the one formed with a martensite structure. The yield points (proof stresses) of samples having a thickness of 0.8 mm was about 2.5 times that of a raw material before heat treatment, but the breaking elongation thereof were about twice that of one formed with a martensite structure.

TEST EXAMPLE 6

A steel pipe made of carbon steel for machine structure (STKM-13C) with a diameter of 12 mm, a thickness of 1.0 mm, and C content of 0.08% was heat-treated while being rotated at a rotation speed of 400 rpm. With regard to the case in which the heat treatments in the first process and the second process were performed by the high-frequency induction heating apparatus illustrated in FIG. 8A (represented as "two-stage heat treatment" in FIG. 19) and the case in which only the heat treatment in the first process was performed (represented as "one-stage heat treatment" in FIG. 19), tensile tests were performed and compared with each other. The result is shown in FIG. 19.

Figure 19:
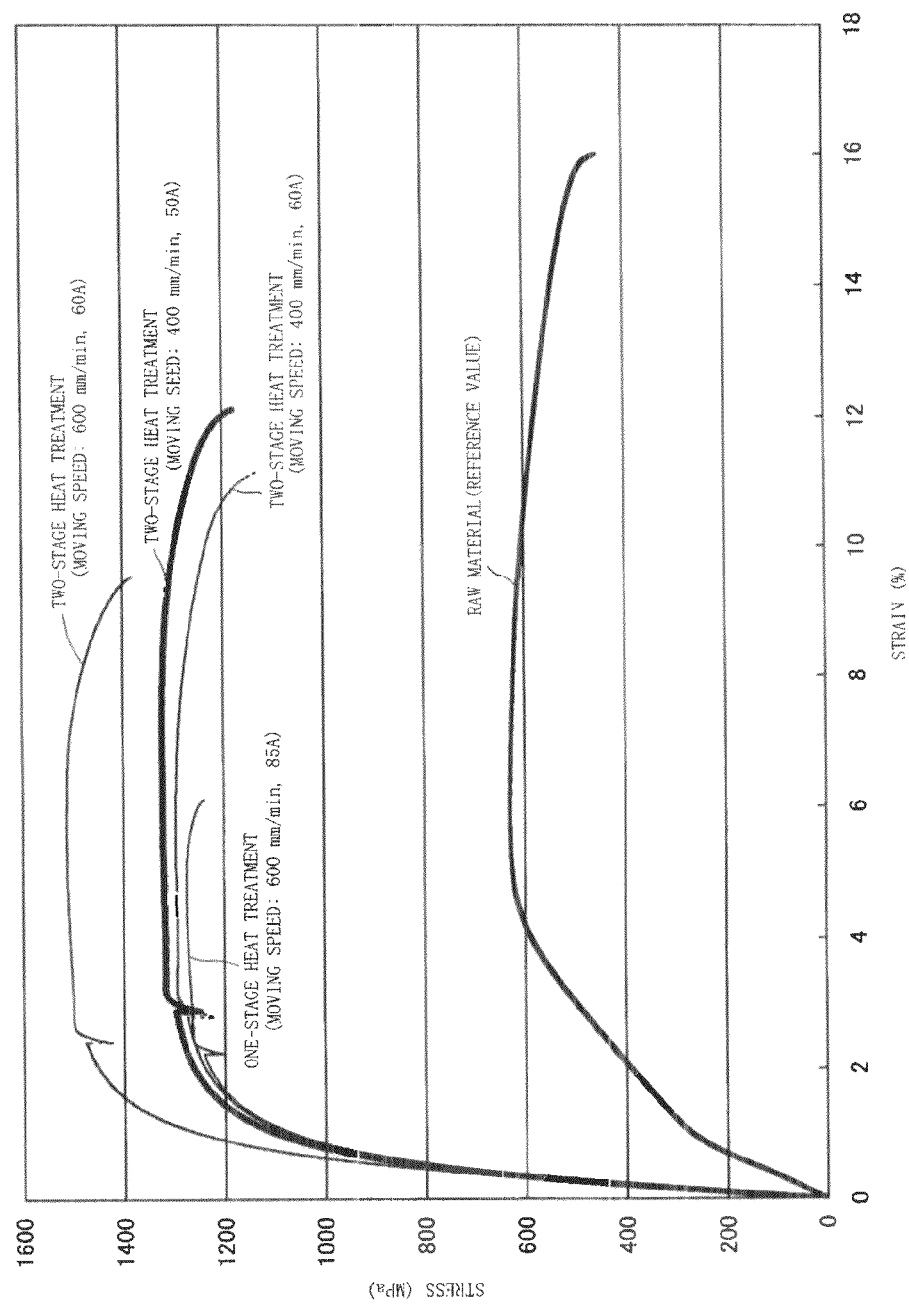
FIG. 19 is a graph illustrating a measurement result of a tensile test of pipe-shaped steel in Test Example 6.

As apparent from FIG. 19, samples which were subjected to the two-stage heat treatment became about at least twice that of a raw material with regard to the yield point (proof stress) and they had breaking elongation about twice that of a sample which was subjected to the one-stage heat treatment. Incidentally, since the "Raw Material" in FIG. 19 was not attached with an elongation meter, a rising of a graph thereof was different from those of the other samples which were heat-treated, but the breaking elongation thereof was corrected from actual measured values. Further, in graphs of samples which were heat-treated, the reason why loads applied to the samples dropped halfway was because a measuring machine was stopped and the elongation meter was detached from the samples halfway since while the sample was being attached with a measuring tool, it could not be measured until breaking took place.

From the above, it was found that all of the hardness, the yield point (proof stress), the tensile strength, the reaction force due to deflection of a beam caused by a bending moment, and the breaking elongation of steel where the microstructure which was subjected to the heat treatment was a duplex grain structure or a duplex grain structure with island-shaped or chain-shaped martensites formed (the duplex grain structure containing a hard phase), namely, steel which was subjected to the rapid heating and rapid cooling treatments in the first process and the second process were maintained in high level, and steel having high strength and high toughness (high ductility) could be obtained while it was obtained by heat-treating a commercially-available ordinary steel.

The invention claimed is:

1. A structural material in a frame member for a seat, the structural member using thin steel obtained by joining and integrating thin steel members in a part thereof, comprising:
a reinforced portion formed of a bead, a bracket or a combination of the bead and the bracket provided in the thin steel, wherein heat treatment is applied to a part thereof after the joining, and by this heat treatment, two types or more of metal structures with different strength and toughness are formed in the thin steel,
wherein the shape of a transmission path of force formed by the reinforced portion and a portion with hardness higher than a raw material state portion formed by the heat treatment, is formed to be a substantially truss shape, both prior to, and during, the application of the force,
wherein the thin steel is used as a side frame for a seat;
the reinforced portion and the heat-treated portion are provided so that the transmission path of the force, having the substantially truss shape, is formed at least at one spot in the side frame; and
a seat belt anchor provided at the at least one spot in the side frame.

2. The structural material according to claim 1, wherein an entire peripheral edge part is subjected to hemming, and at least the peripheral edge part subjected to hemming is heat-treated.

3. The structural material according to claim 2, wherein the peripheral edge part subjected to hemming has the thin steel members welded to each other by heat treatment.

4. The structural material according to claim 1, wherein the metal structure of the thin steel formed by the heat treatment includes at least one of a martensite structure, a duplex grain structure, a duplex grain structure containing a hard phase in which a hard phase structure with hardness higher than the duplex grain structure is contained in the duplex grain structure, or a duplex grain structure containing a hard phase with a hardness higher than the other portion of the duplex grain structure.

5. The structural material according to claim 4, wherein the joined portion has the martensite structure, the duplex grain structure or duplex grain structure containing a hard phase by heat treatment, and the portion other than the joined portion has a structure with lower hardness and higher toughness than the metal structure of the joined portion including the structure of the raw material state not subjected to heat treatment.

6. The structural material according to claim 1, wherein the thin steel is made of thin low-carbon steel, which is ordinary steel having a thickness of 1.2 mm or less, the content of C is 0.01 to 0.12% in mass %, and the remaining part is iron and inevitable impurities.

7. The structural material according to claim 4, wherein the duplex grain structure is configured by mixing a crystal grain having a grain diameter of 1 μm to less than 5 μm and a crystal grain having a grain diameter of 5 to 30 μm.

8. The structural material according to claim 4, wherein the duplex grain structure containing a hard phase is a structure in which island-shaped or chain-shaped martensites having grain diameters of 30 μm or less as the hard phase are diffused in the duplex grain structure in which the crystal grain having a grain diameter of 1 μm to less than 5 μm and the crystal grain having a grain diameter of 5 to 30 μm are mixed.

9. A seat for transportation equipment having a structural material using thin steel obtained by joining and integrating thin steel members in a part thereof, comprising:
- a reinforced portion formed of a bead, a bracket or a combination of the bead and the bracket provided in the thin steel, wherein heat treatment is applied to a part thereof after the joining, and by this heat treatment, two types or more of metal structures with different strength and toughness are formed in the thin steel,
- wherein the shape of a transmission path of force formed by the reinforced portion and a portion with hardness higher than a raw material state portion formed by the heat treatment is formed to be a substantially truss shape, both prior to, and during, the application of the force, wherein the thin steel is used as a side frame for a seat;
- the reinforced portion and the heat-treated portion are provided so that the transmission path of the force, having the substantially truss shape, is formed at least at one spot in the side frame; and
- a seat belt anchor provided at the at least one spot in the side frame.

* * * * *